(12) United States Patent
Ito et al.

(10) Patent No.: US 11,174,824 B2
(45) Date of Patent: Nov. 16, 2021

(54) COVER FOR FUEL TANK

(71) Applicant: AISAN KOGYO KABUSHIKI KAISHA, Obu (JP)

(72) Inventors: Satoshi Ito, Toyohashi (JP); Koji Yoshida, Commerce Township, MI (US); Kensuke Niwa, Nagoya (JP); Shuhei Noguchi, Okazaki (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 17/042,224

(22) PCT Filed: Mar. 12, 2019

(86) PCT No.: PCT/JP2019/009923
§ 371 (c)(1),
(2) Date: Sep. 28, 2020

(87) PCT Pub. No.: WO2019/188242
PCT Pub. Date: Oct. 3, 2019

(65) Prior Publication Data
US 2021/0025361 A1 Jan. 28, 2021

(30) Foreign Application Priority Data
Mar. 28, 2018 (JP) .............................. JP2018-061626

(51) Int. Cl.
*F02M 37/10* (2006.01)
*B60K 15/03* (2006.01)
*B60K 15/077* (2006.01)

(52) U.S. Cl.
CPC ... *F02M 37/10* (2013.01); *B60K 2015/03171* (2013.01); *B60K 2015/03453* (2013.01);
(Continued)

(58) Field of Classification Search
CPC .......... B60K 2015/03171; B60K 2015/03453; B60K 2015/03467
See application file for complete search history.

(56) References Cited

U.S. PATENT DOCUMENTS 4,869,225 A * 9/1989 Nagata ................. F02M 37/106
123/509
5,482,444 A * 1/1996 Coha .................... F02M 37/103
248/638

(Continued)

FOREIGN PATENT DOCUMENTS

| JP | 2003534490 A | 11/2003 |
| JP | 2012082815 A | 4/2012 |

(Continued)

OTHER PUBLICATIONS

PCT/JP2019/009923 International Search Report and Written Opinion dated Jun. 4, 2019 (13 p.).

(Continued)

*Primary Examiner* — Kevin R Steckbauer
(74) *Attorney, Agent, or Firm* — Conley Rose, P.C.

(57) ABSTRACT

A fuel tank cover (150) is provided with a flange unit (22) closing an opening of a fuel tank, and a joint member (24) configured to be connected to the flange unit (22) movably in the upward/downward direction. The flange unit (22) includes a side tubular portion (43) extending in the upward/downward direction. The joint member (24) includes a columnar portion (160) extending in the upward/downward direction. The columnar portion (160) is inserted into the side tubular portion (43) movably in the upward/downward direction. A metal retainer (162) is provided to cover an outer circumferential surface of the columnar portion (160).

5 Claims, 17 Drawing Sheets

(52) U.S. Cl.
CPC ............... *B60K 2015/03467* (2013.01); *B60K 2015/0775* (2013.01)

(56) References Cited

U.S. PATENT DOCUMENTS

| | | | | |
|---|---|---|---|---|
| 6,260,543 | B1* | 7/2001 | Chih | B01D 35/027 123/509 |
| 6,923,164 | B1* | 8/2005 | Mitsudou | F02M 37/50 123/509 |
| 7,108,487 | B2* | 9/2006 | Koba | F02M 37/103 417/360 |
| 7,124,748 | B2* | 10/2006 | Gaffield | F02M 37/0094 123/509 |
| 7,237,538 | B2* | 7/2007 | Perruchot | F02M 37/106 123/509 |
| 7,389,768 | B2* | 6/2008 | Hayakawa | F02M 37/106 123/509 |
| 7,415,974 | B2* | 8/2008 | Akiba | F02M 37/106 123/509 |
| 7,472,693 | B2* | 1/2009 | Izutani | F02M 37/34 123/509 |
| 8,689,827 | B2* | 4/2014 | Okazono | B01D 35/26 137/565.34 |
| 9,328,704 | B2* | 5/2016 | Okazono | B01D 35/027 |
| 9,388,780 | B2 | 7/2016 | Oikawa et al. | |
| 9,539,893 | B2* | 1/2017 | Hsu | B60K 15/067 |
| 9,803,594 | B2* | 10/2017 | Ishitoya | F02M 37/106 |
| 10,012,189 | B2* | 7/2018 | Kondo | F02M 37/103 |
| 10,054,089 | B2* | 8/2018 | Takahashi | F02M 37/0029 |
| 10,215,614 | B2* | 2/2019 | Flynn | G01F 23/683 |
| 10,436,161 | B2* | 10/2019 | Kim | F02M 37/14 |
| 10,443,552 | B2* | 10/2019 | Fukuoka | B01D 29/11 |
| 10,544,762 | B2* | 1/2020 | Fukui | F02M 37/106 |
| 10,634,102 | B2* | 4/2020 | Soreo | F04B 49/04 |
| 10,641,218 | B2* | 5/2020 | Fujiseki | F02M 37/103 |
| 10,648,436 | B2* | 5/2020 | Adachi | F02M 37/0082 |
| 10,669,976 | B2* | 6/2020 | Fukuoka | F02M 37/0082 |
| 10,690,096 | B2* | 6/2020 | Hayashi | F02B 37/025 |
| 10,704,514 | B2* | 7/2020 | Kobayashi | F02M 37/103 |
| 10,780,794 | B2* | 9/2020 | Zenner | H01M 10/6554 |
| 10,794,342 | B2* | 10/2020 | Maruyama | F02M 37/103 |
| 10,850,606 | B2* | 12/2020 | Niwa | F02M 37/0076 |
| 10,865,750 | B2* | 12/2020 | Soreo | B01D 35/0273 |
| 10,907,593 | B2* | 2/2021 | Higashi | F02M 37/103 |
| 2001/0001963 | A1* | 5/2001 | Murakoshi | F02M 37/0082 137/565.34 |
| 2004/0037714 | A1* | 2/2004 | Koba | F02M 37/103 417/360 |
| 2004/0074995 | A1* | 4/2004 | Okada | B01D 35/26 239/533.1 |
| 2004/0163630 | A1* | 8/2004 | Powell | F02M 37/106 123/509 |
| 2005/0155583 | A1* | 7/2005 | Mitsudou | F02M 37/50 123/509 |
| 2005/0166974 | A1* | 8/2005 | Hashiguchi | F02M 37/106 137/571 |
| 2005/0217733 | A1* | 10/2005 | Hayakawa | F02M 37/106 137/565.17 |
| 2006/0130815 | A1* | 6/2006 | Gaffield | F02M 37/103 123/509 |
| 2007/0056567 | A1* | 3/2007 | Perruchot | F02M 37/106 123/509 |
| 2007/0215115 | A1* | 9/2007 | Hazama | F02D 41/3082 123/458 |
| 2009/0028690 | A1* | 1/2009 | Kawajiri | F02M 37/18 415/55.1 |
| 2011/0168134 | A1* | 7/2011 | Lim | F02M 37/103 123/509 |
| 2012/0060948 | A1* | 3/2012 | Okazono | F04B 23/021 137/565.17 |
| 2015/0330341 | A1* | 11/2015 | Rossi | B60K 15/03 137/565.01 |
| 2016/0238172 | A1* | 8/2016 | Ishitoya | F02M 37/106 |
| 2017/0241386 | A1* | 8/2017 | Mason | F02M 37/50 |
| 2017/0248106 | A1* | 8/2017 | Niwa | F02M 37/103 |
| 2017/0268470 | A1* | 9/2017 | Murakoshi | F02M 37/103 |
| 2017/0268471 | A1* | 9/2017 | Fukui | F02M 37/10 |
| 2017/0276105 | A1* | 9/2017 | Kondo | F02M 37/0017 |
| 2017/0314522 | A1* | 11/2017 | Takahashi | F02M 55/04 |
| 2017/0328318 | A1* | 11/2017 | Fukui | F02M 37/106 |
| 2018/0031408 | A1* | 2/2018 | Flynn | G01F 23/30 |
| 2018/0328323 | A1* | 11/2018 | Fukuoka | F02M 37/50 |
| 2019/0017474 | A1* | 1/2019 | Adachi | F02M 37/0052 |
| 2019/0024615 | A1* | 1/2019 | Hayashi | F02M 37/0052 |
| 2019/0024617 | A1* | 1/2019 | Fukui | F02M 37/103 |
| 2019/0032614 | A1* | 1/2019 | Fukuoka | F02M 37/0082 |
| 2019/0047405 | A1* | 2/2019 | Niwa | B60K 15/03504 |
| 2019/0078541 | A1* | 3/2019 | Kobayashi | F02M 37/0017 |
| 2019/0136809 | A1* | 5/2019 | Fujiseki | F02M 37/106 |
| 2019/0136810 | A1* | 5/2019 | Niwa | F02M 37/50 |
| 2019/0211785 | A1* | 7/2019 | Akiba | F02M 37/00 |
| 2019/0331073 | A1* | 10/2019 | Higashi | F02M 37/50 |
| 2020/0080524 | A1* | 3/2020 | Soreo | F02M 37/103 |
| 2020/0080525 | A1* | 3/2020 | Soreo | B01D 35/0273 |
| 2020/0173407 | A1* | 6/2020 | Soreo | F02M 37/106 |
| 2021/0025360 | A1* | 1/2021 | Ito | F02M 37/10 |
| 2021/0033051 | A1* | 2/2021 | Ito | F16M 13/022 |
| 2021/0033053 | A1* | 2/2021 | Hayashi | F02M 59/44 |

FOREIGN PATENT DOCUMENTS

| | | | | |
|---|---|---|---|---|
| JP | 2012202231 | A | * 10/2012 | ............ F02M 37/00 |
| JP | 2012202231 | A | 10/2012 | |
| JP | 2013029051 | A | 2/2013 | |
| JP | 2014238054 | A | 12/2014 | |
| JP | 2017166472 | A | 9/2017 | |
| JP | 2017194005 | A | 10/2017 | |

OTHER PUBLICATIONS

PCT/JP2019/009923 International Preliminary Report on Patentability dated Oct. 8, 2020 (9 p.).
English Translation of PCT/JP2019/009923 International Preliminary Report on Patentability dated Oct. 8, 2020 (17 p.).
Japanese Office Action dated Mar. 15, 2021, for Japanese Application No. 2018-061626 (3 p.).
English Translation of Japanese Office Action dated Mar. 15, 2021, for Japanese Application No. 2018-061626 (3 p.).
Japanese Office Action dated May 24, 2021, for Japanese Application No. 2018-061626 (2 p.).
English Translation of Japanese Office Action dated May 24, 2021, for Japanese Application No. 2018-061626 (2 p.).

* cited by examiner

COVER FOR FUEL TANK

CROSS-REFERENCE TO RELATED APPLICATIONS

The present application a 35 U.S.C. § 371 national stage application of, PCT Application No. PCT/JP2019/009923 filed Mar. 12, 2019, which claims priority to Japanese Patent Application No. 2018-061626 filed Mar. 28, 2018, each of which is incorporated herein by reference in its entirety for all purposes.

STATEMENT REGARDING FEDERALLY SPONSORED RESEARCH OR DEVELOPMENT

Not applicable.

BACKGROUND

The present disclosure relates generally to covers for fuel tanks.

A fuel supply device for supplying fuel within a fuel tank installed in a vehicle (e.g., an automobile or the like) to an internal combustion engine (i.e., an engine) is described, for example, in Japanese Laid-Open Patent Publication No. 2017-166472. As described in Japanese Laid-Open Patent Publication No. 2017-166472, a cover for a fuel tank has a cover member configured to close an opening of the fuel tank and a connecting member connected to the cover member so as to be movable in the upward/downward direction. Tubular portions extending in the upward/downward direction are formed on the cover member. Columnar portions extending in the upward/downward direction are formed on the connecting member. The columnar portions are inserted in the tubular portions so as to be movable in the upward/downward direction. An essential part of the cover member and an essential part of the connecting member are made of resin.

SUMMARY

A first aspect of this disclosure is a cover for a fuel tank including a cover member closing an opening of the fuel tank, and a connecting member configured to be connected to the cover member movably in an upward/downward direction. The cover member includes a tubular portion made of a resin and extending in the upward/downward direction. The connecting member includes a columnar portion made of a resin and extending in the upward/downward direction. The columnar portion is moveably disposed in the tubular portion. The columnar portion is configured to move in the upward/downward direction relative to the tubular portion. A tubular member made of a metal is provided to substantially cover an outer circumferential surface of the columnar portion.

DETAILED DESCRIPTION

If a cover member deforms when an external force is applied to a cover for a fuel tank in the event of vehicle collision, fuel leakage may occur. It is therefore desired to suppress deformation of the cover member due to the external force. As previously described, Japanese Laid-Open Patent Publication No. 2017-166472 teaches the columnar portions of the connecting member are moveably disposed in the tubular portions of the cover member. A stress concentration region in the columnar portion of the connecting member may arise due to a reduction in a section modulus of the columnar portion. Accordingly, it is necessary to carefully balance the strength of the columnar portion required to withstand a normal load (referred to as "normally required rigidity") and the strength of the stress concentration part desired upon an excessive load, such as the time of a vehicle collision (referred to as "deformation rigidity during collision"). Therefore, there has been a need for improved cover for a fuel tank.

In accordance with the embodiments described herein, deformation of the cover member due to an external force can be suppressed without requiring the columnar portion itself to have the troublesome balancing between the necessary rigidity during normal times and the deformation rigidity at the time of collision.

Figure 1:
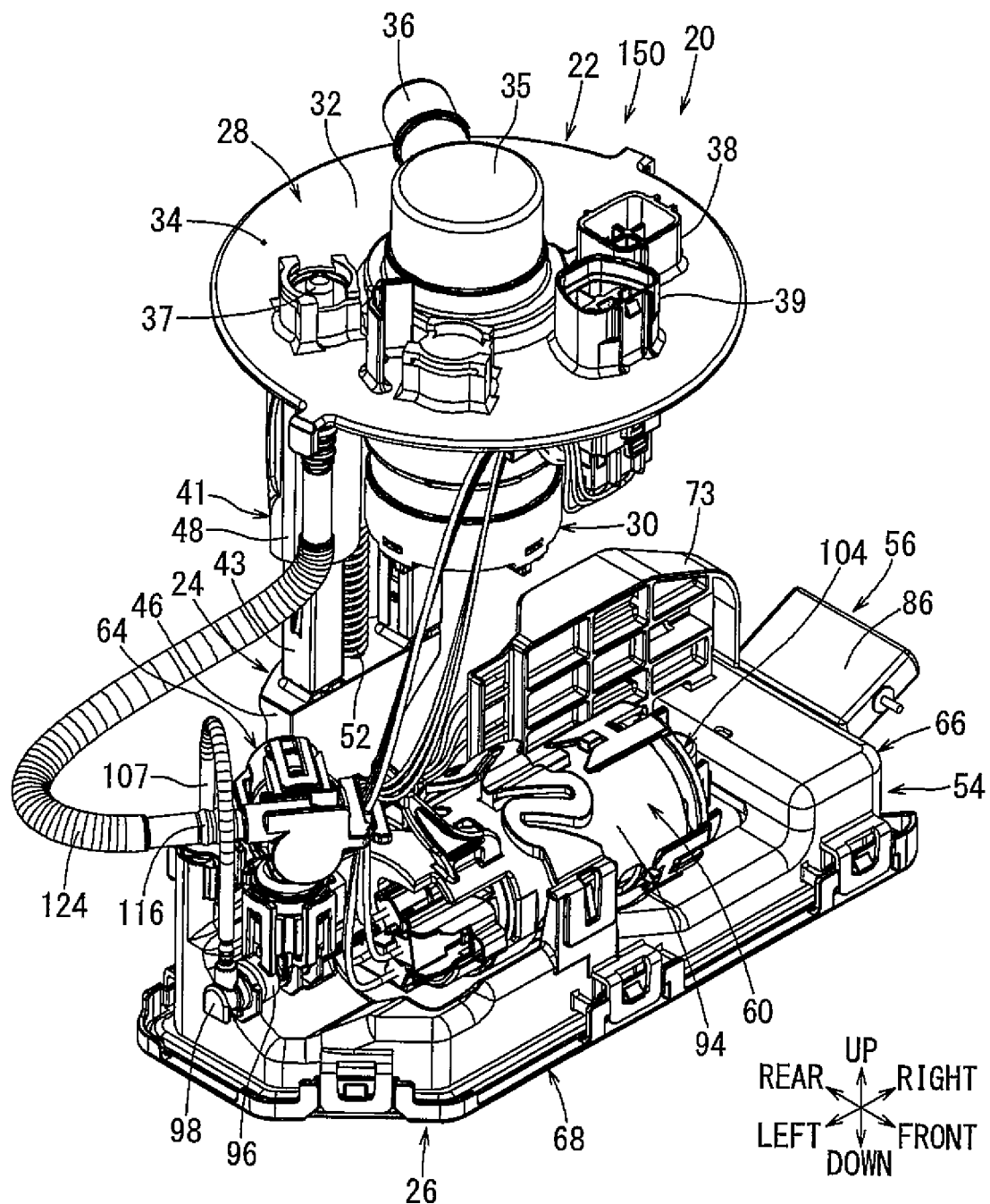
FIG. 1 is a perspective view a fuel supply device according to an embodiment.
Figure 2:
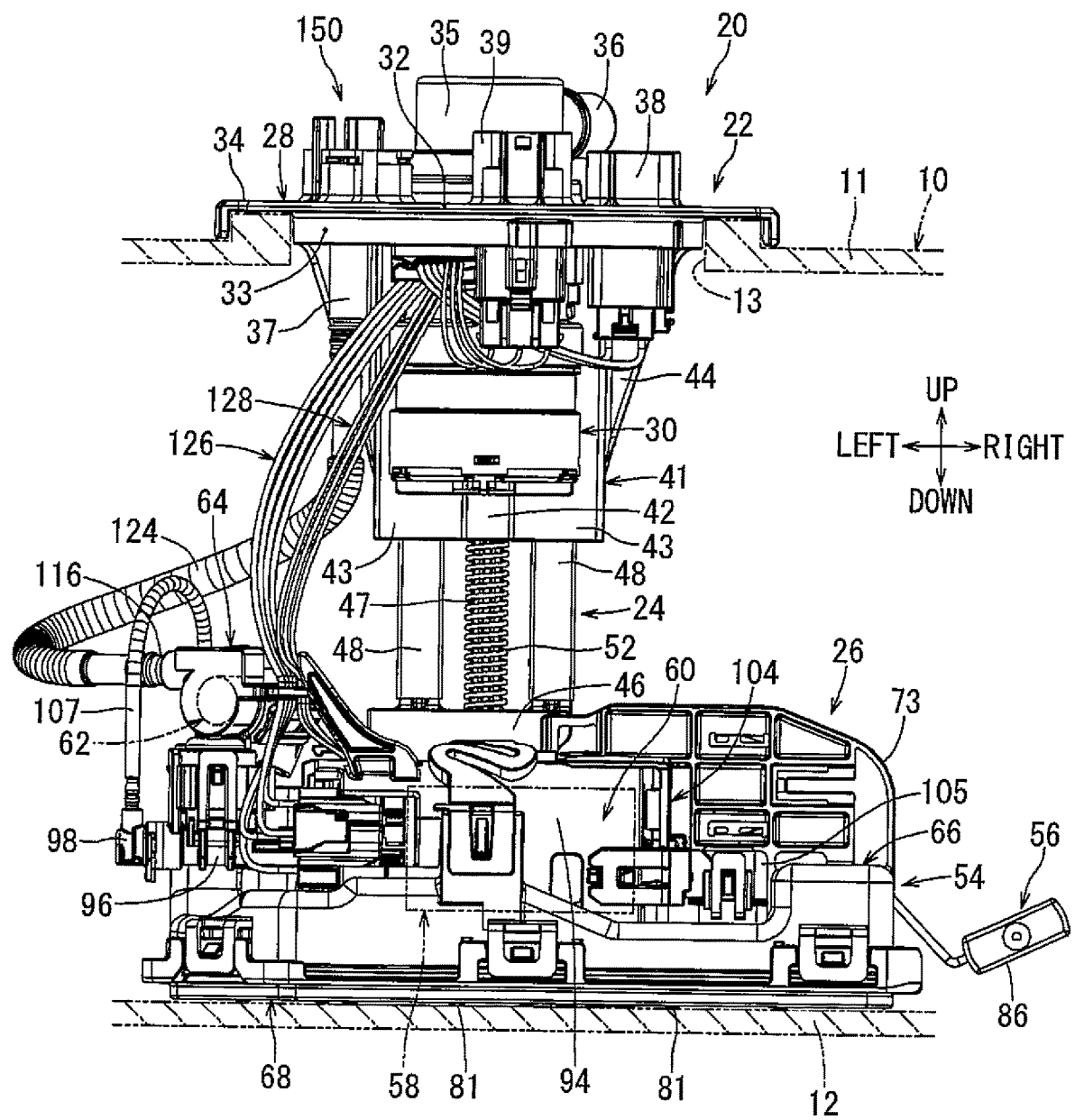
FIG. 2 is a front view of the fuel supply device of FIG. 1.
Figure 3:
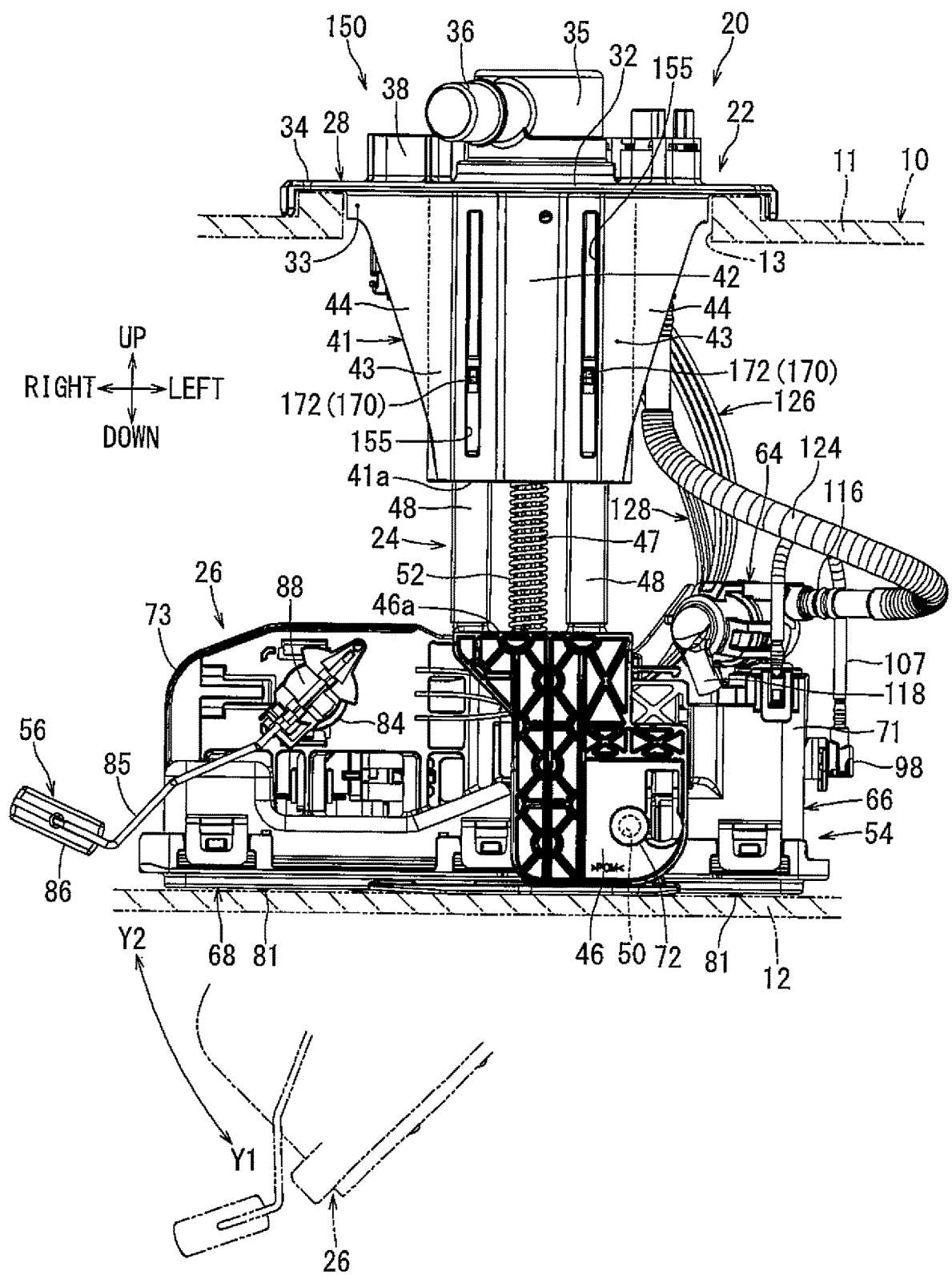
FIG. 3 is a rear view of the fuel supply device of FIG. 1.

Hereinafter, an embodiment of the apparatus and methods disclosed herein will be described with reference to the drawings. A cover for a fuel tank according to the present embodiment may be used for a fuel supply device. The fuel supply device may be installed in the fuel tank mounted on a vehicle (e.g., an automobile or the like) equipped with an engine (e.g., an internal combustion engine), and may serve to supply fuel within the fuel tank to the engine. FIG. 1 is a perspective view of an embodiment of a fuel supply device. FIG. 2 is a front view of the same. FIG. 3 is a rear view of the same. In FIGS. 1 to 3, frontward, rearward, leftward, rightward, upward, and downward directions are shown and correspond to directions of a vehicle. More specifically, a frontward/rearward direction corresponds to a vehicle length direction, leftward/rightward directions are shown and correspond to a vehicle width direction, and upward/downward direction corresponds to a vehicle height direction. The frontward/rearward direction and the leftward/rightward direction of the fuel supply device may be oriented in any direction.

As shown in FIG. 2, a fuel tank 10 may be formed as a hollow container having an upper wall 11 and a bottom wall 12. An opening 13 may be formed as a circular hole in the upper wall 11. The fuel tank 10 may be mounted on a vehicle such that the upper wall 11 and the bottom wall 12 extend horizontally. The fuel tank 10 may be made of resin and may deform (expand or contract mainly in the upward/downward direction) in response to change in tank internal pressure. For example, gasoline as liquid fuel may be stored in the fuel tank 10.

As shown in FIG. 1, a fuel supply device 20 includes a flange unit 22, a joint member 24 and a pump unit 26. The joint member 24 is connected to the flange unit 22 so as to be movable in the upward/downward direction relative thereto, and the pump unit 26 is connected to the joint member 24 so as to be moveable in the upward/downward direction relative thereto.

The flange unit 22 includes a flange main body 28 and a fuel vapor valve 30.

The flange main body 28 comprises a cover plate 32 having a circular plate shape. The flange main body 28 may be made of resin. As shown in FIG. 2, a fitting tubular portion 33 having a short cylindrical shape is concentrically formed on a lower surface of the cover plate 32. An annular disc-like flange portion 34 extends radially outward from the fitting tubular portion 33 around an outer periphery of the cover plate 32. A valve housing 35 having a closed-topped cylindrical shape is concentrically formed on the top of the cover plate 32. An evaporation port 36 extends radially outward from an upper end of the valve housing 35.

As shown in FIG. 1, a fuel outlet port 37, a first electric connector portion 38, and a second electric connector portion 39 are provided on the cover plate 32. The fuel outlet port 37 is a straight tube extending through the cover plate 32 in the upward/downward direction. A predetermined number of metal terminals may be disposed in both electric connector portions 38, 39. The fuel outlet port 37 and both electric connector portions 38, 39 are circumferentially-spaced around the valve housing 35.

As shown in FIG. 3, a standoff portion 41 is disposed on a rear side of the lower surface of the cover plate 32. The standoff portion 41 includes a center tubular portion 42, a left side tubular portion 43, and a right side tubular portion 43. Each tubular portion 42, 43 has tubular shape extending in the upward/downward direction. The whole of the center tubular portion 42 and both side tubular portions 43 are formed symmetrically. The center tubular portion 42 and both side tubular portions 43 share wall parts adjacent to each other. Two left and right curved wall portions 44 are symmetrically formed on outer side portions of both side tubular portions 43. Rear side wall portions of the center tubular portion 42 and both side tubular portions 43 and both curved wall portions 44 are continuous with a rear half of the fitting tubular portion 33 of the flange main body 28. In this embodiment, both curved wall portions 44 have a substantially triangular shape, which are tapered downward from the fitting tubular portion 33 as viewed from the back.

As shown in FIG. 2, the fuel vapor valve 30 is attached within the valve housing 35 of the flange main body 28 such that the top portion of the fuel vapor valve 30 is accommodated therein. The fuel vapor valve 30 is an integrated valve having, for example, a fuel vapor control valve and a full-tank regulating valve may be used. The fuel vapor control valve closes when the internal pressure in the fuel tank is smaller than the predetermined value, and opens when the internal pressure becomes greater than the predetermined value. Further, the full-tank regulating valve opens when fuel in the fuel tank 10 is not full, and closes when filled full with fuel.

As shown in FIG. 3, the joint member 24 includes a joint main body 46, a spring guide 47, a left side columnar portion 48, and a right side columnar portion 48. The joint main body 46 may be made of resin, and may be formed in a flat block shape in the frontward/rearward direction. The joint main body 46 has a horizontal upper end face 46a. An engagement shaft hole 50 extends through a lower portion of the joint main body 46 in the frontward/rearward direction. In this embodiment, the spring guide 47 is formed like a strut on the center of the upper end face 46a of the joint main body 46. Both side columnar portions 48 are formed symmetrically and in a rectangular columnar shape on both left and right ends of the upper end face 46a of the joint main body 46.

A metal coil spring 52 is fitted onto the spring guide 47 of the joint member 24. In this state, the spring guide 47 of the joint member 24 is inserted into the center tubular portion 42 of the flange main body 28 together with the coil spring 52. Further, both side columnar portions 48 of the joint member 24 are simultaneously inserted into both side tubular portions 43 of the flange main body 28. The side tubular portions 43 and the corresponding side columnar portions 48 are connected by snap-fitting so as to be relatively movable in the axial direction within the predetermined range. Moreover, the flange main body 28 and the joint main body 46 are biased apart (i.e., away from each other) by the coil spring 52.

Figure 4:
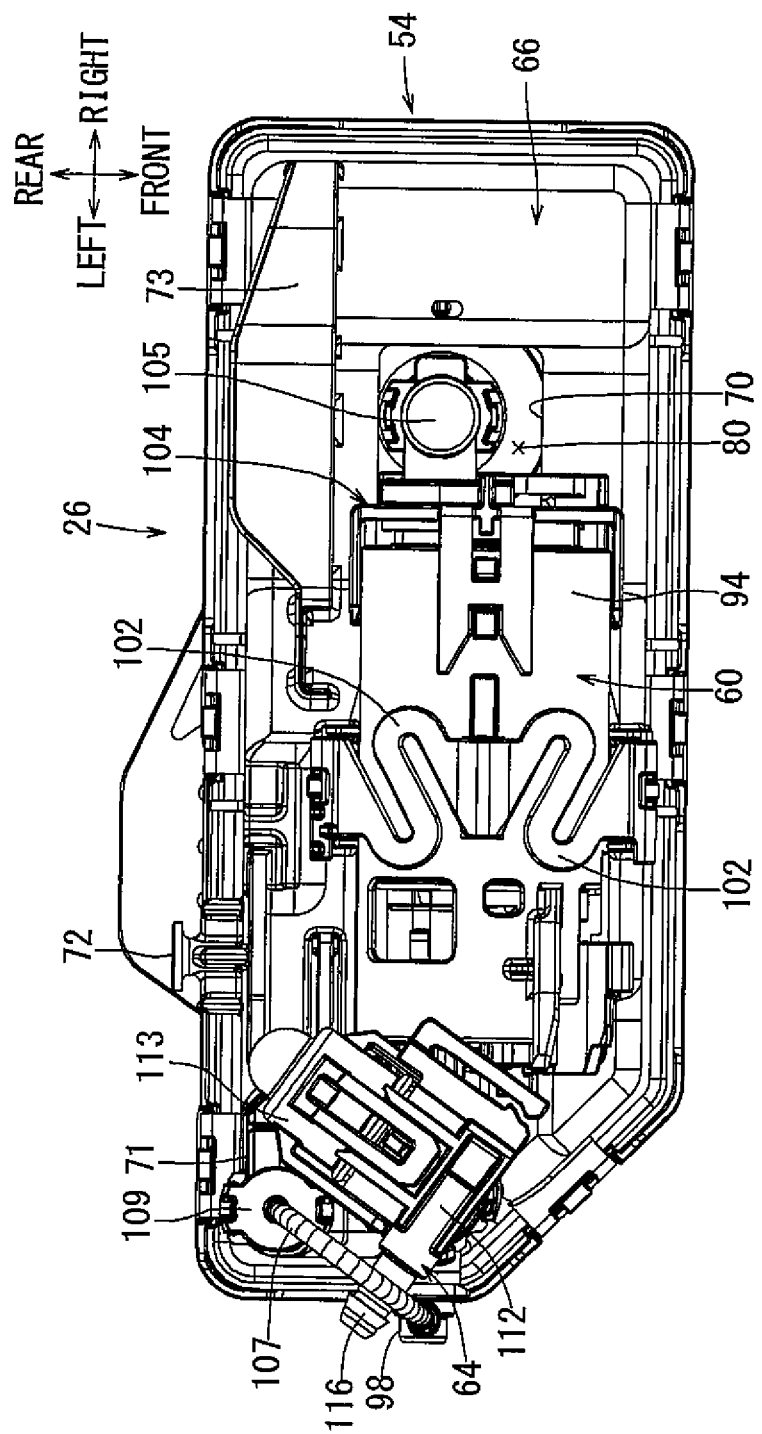
FIG. 4 is a top view the pump unit of FIG. 1.
Figure 5:
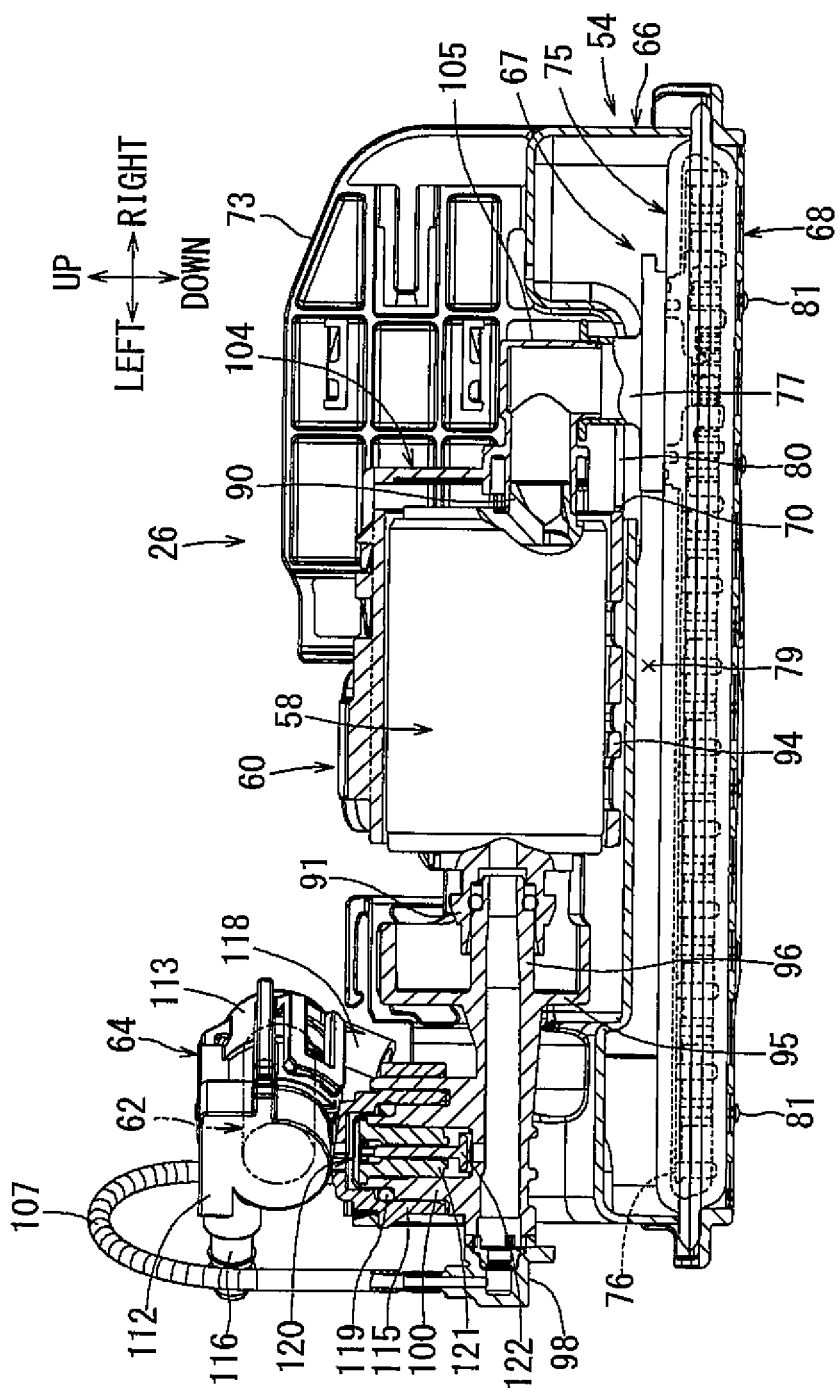
FIG. 5 is a front, partial cutaway view of the pump unit of FIG. 1.

As shown in FIG. 2, the pump unit 26 may include a sub-tank 54, a sender gauge 56, a fuel pump 58, a pump case 60, a pressure regulator 62, and a regulator case 64. FIG. 4 is a top view of the pump unit 26. FIG. 5 is a partially cutaway front view of the pump unit 26. The sender gauge 56 is not shown in FIGS. 4 and 5.

As shown in FIG. 5, the sub-tank 54 includes a sub-tank main body 66, a fuel filter 67, and a cover member 68.

The sub-tank main body 66 may be made of resin and formed in an inverted shallow box shape with the bottom side opened. In particular, the sub-tank main body 66 may be formed to have a rectangular shape elongated in the leftward/rightward direction in a top view (see FIG. 4). A rectangular opening hole 70 is formed to the right on the top side of the sub-tank main body 66. A fuel receiving tubular portion 71 is formed to the left rear of the top side of the sub-tank main body 66 (see FIG. 4). The fuel receiving tubular portion 71 has a rectangular tubular shape extending upwardly. The top side of the fuel receiving tubular portion 71 is opened.

As shown in FIG. 3, a rearward projecting engagement shaft 72 is provided to the left on a lower portion of the rear side of the sub-tank main body 66 (see FIG. 4). Further, a plate-like upright wall 73 facing the frontward/rearward direction is provided on the right rear portion of the top side of the sub-tank main body 66.

As shown in FIG. 5, the fuel filter 67 includes a filter member 75, an inner frame member 76, and a connecting pipe 77. The filter member 75 has a hollow bag shape with a filter material made of resin non-woven fabric. A contour of the filter member 75 has an elongated rectangular shape, which is flat in the upward/downward direction such that its longitudinal direction corresponds to the leftward/rightward direction.

The inner frame member 76 may be made of resin and have a skeleton structure that retains the filter member 75 in an expanded or inflated state in the upward/downward direction. Further, the connecting pipe 77 may be made of resin and has a vertical round tubular shape. The connecting pipe 77 is joined on the right portion of the inner frame member 76 by heat fusion. An upper side of the filter member 75 is interleaved between the inner frame member 76 and the connecting pipe 77. The inside and the outside of the filter member 75 may be in fluid communication via the connecting pipe 77.

The filter member 75 is arranged so as to close the bottom opening of the sub-tank main body 66. A fuel storage space 79 for storing fuel is provided between the sub-tank main body 66 and the filter member 75. The connecting pipe 77 is disposed within the opening hole 70 of the sub-tank main body 66. An annular space between the opening hole 70 and the connecting pipe 77 defines a fuel flow inlet 80. The fuel in the fuel tank 10 (see FIG. 2) may flow into the fuel storage space 79 through the flow inlet 80 under its own weight.

The cover member 68 has an elongated rectangular plate shape including a plurality of openings. The cover member 68 may be made of resin. The cover member 68 is attached to the sub-tank main body 66 by snap-fitting. A peripheral edge of the filter member 75 is interleaved between peripheral edges of the sub-tank main body 66 and the cover member 68. The cover member 68 covers a lower side of the filter member 75. A plurality of spaced semi-spherical projections 81 are formed on a lower side of the cover member 68.

As shown in FIG. 3, the sender gauge 56 includes a gauge main body 84, an arm 85, and a float 86. The gauge main body 84 is attached to a rear side of the upright wall 73 of the sub-tank main body 66. A base end portion of the arm 85 may be attached to a rotating portion 88, which rotatably couples the arm 85 to the gauge main body 84, thereby allowing the arm 85 to rotate about a horizontal axis. The float 86 is attached to a free end portion of the arm 85. The sender gauge 56 is a liquid level meter configured to detect a residual amount of fuel in the fuel tank 10, i.e., a position of the liquid level.

As shown in FIG. 5, the fuel pump 58 may be an electric fuel pump formed in a substantially cylindrical columnar shape. The fuel pump 58 includes a motor portion and a pump portion that function to draw, pressurize, and discharge fuel. The fuel pump 58 includes a fuel suction port 90 on a pump portion side end (right end) and a fuel discharge port 91 on a motor portion side end (left end). Further, an electric connector is provided on the motor portion side end of the fuel pump 58. For example, a brushless DC motor may be used for the motor portion.

As shown in FIG. 5, the pump case 60 includes a case main body 94 having a hollow cylindrical shape extending in the leftward/rightward direction. The pump case 60 may be made of resin. An end plate 95 is formed at an opening on one side (a left side opening) of the case main body 94 for closing the opening. A discharge pipe portion 96 comprising a straight tube extends through the end plate 95 and is provided in the center of the end plate 95. A resin pipe joint 98 having an elbow shape is joined at a tip end of the discharge pipe portion 96 by welding. Further, a connecting tubular portion 100 having an upward projecting cylindrical shape is positioned toward the tip end of the discharge pipe portion 96. The inside of the connecting tubular portion 100 is in fluid communication with the inside of the discharge pipe portion 96. The fuel pump 58 is disposed in the case main body 94 with the fuel discharge port 91 oriented to the left. The fuel discharge port 91 is connected to the base end (right end) portion of the discharge pipe portion 96.

As shown in FIG. 4, a pair of front and rear elastic support pieces 102 extending in opposite directions are provided on an upper end of the center of the case main body 94 and are symmetrical in the frontward/rearward direction. Both elastic support pieces 102 have a strip shape and are formed in a substantially S-shape in a plan view. The tip ends of both elastic support pieces 102 are attached to both front and rear sides of the sub-tank main body 66 by snap-fitting. The pump case 60 is elastically supported on the sub-tank main body 66 in a horizontal state, i.e., a laterally placed state, by both elastic support pieces 102.

As shown in FIG. 5, a resin cap 104 is attached to the case main body 94 by snap-fitting so as to close a right end opening surface of the case main body 94. A suction pipe portion 105 having an elbow pipe shape is formed on the cap 104. One end (left end) of the suction pipe portion 105 is connected to the fuel suction port 90 of the fuel pump 58. The other end (lower end) of the suction pipe portion 105 is connected to the connecting pipe 77 of the fuel filter 67. The suction pipe portion 105 is attached to the connecting pipe 77 by snap-fitting.

One end of a fuel discharge tube 107 made of a resin flexible tube is connected to the pipe joint 98 by press fitting. A nozzle member 109 is connected to the other end of the fuel discharge tube 107 by press fitting (see FIG. 4). The nozzle member 109 is attached on a left rear portion of the fuel receiving tubular portion 71 by snap-fitting. The fuel discharge tube 107 may be bent in an inverted U-shape (see FIG. 5).

As shown in FIG. 5, a contour of the pressure regulator 62 has a substantially cylindrical columnar shape. The pressure regulator 62 serves to regulate the pressure of the pressurized fuel discharged from the fuel pump 58, i.e., the pressure of fuel to be supplied to an engine, at a predetermined pressure.

The pressure regulator case 64 may be made of resin and is formed to have a hollow cylindrical container shape. The regulator case 64 includes a first case half 112 and a second case half 113 divided in the axial direction. The case halves 112, 113 are attached by snap-fitting. The pressure regulator 62 is disposed in the regulator case 64. The regulator case 64 is disposed in a laterally placed state where the axial direction thereof is horizontal.

A cylindrical connected tubular portion 115 projecting downwardly and a fuel discharge portion 116 projecting outwardly from the upper end in the tangential direction are formed on the first case half 112. The connected tubular portion 115 and the fuel discharge portion 116 are in fluid communication with a fuel introduction port of the pressure regulator 62 within the first case half 112.

A discharge pipe portion 118 projecting downward from an end opposite to the first case half 112 is formed on the second case half 113. The discharge pipe portion 118 is in fluid communication with a surplus fuel discharge port of the pressure regulator 62 disposed in the second case half 113. The fuel discharge portion 116 discharges the fuel, of which pressure is regulated in the pressure regulator 62. Surplus fuel from the pressure regulator 62 is discharged through the discharge pipe portion 118.

The connected tubular portion 115 of the regulator case 64 is fitted so as to be connected to the connecting tubular portion 100 of the pump case 60. An O-ring 119 is interposed between the connecting tubular portion 100 and the connected tubular portion 115 for elastically sealing a gap therebetween. Further, the fuel discharge portion 116 is oriented in the rear left direction from the upper end of the first case half 112 (see FIGS. 4 and 5). Furthermore, the discharge pipe portion 118 is oriented to the inside of the fuel receiving tubular portion 71 of the sub-tank main body 66 (see FIG. 3).

As shown in FIG. 5, a check valve 120 is incorporated into the connecting tubular portion 100 of the pump case 60. The check valve 120 may be a residual-pressure retention check valve, which serves to prevent backflow of pressurized fuel in the connecting tubular portion 100. The check valve 120 includes a valve guide 121 and a valve body 122. The valve guide 121 is fixedly disposed within the connecting tubular portion 100. The valve body 122 is disposed in the valve guide 121 so as to be concentric and axially movable (upward/downward direction), i.e., so as to open and close. The valve body 122 may close by its own weight and open by fuel pressure.

As shown in FIG. 3, an engagement shaft 72 of the sub-tank main body 66 is rotatably engaged in an engagement shaft hole 50 of the joint main body 46. As a result, the pump unit 26 is rotatably connected to the joint member 24 in the upward/downward direction (see directions indicated by arrows Y1, Y2 in FIG. 3). The fuel outlet port 37 in the flange main body 28 is connected to the fuel discharge portion 116 at the regulator case 64 via a discharge fuel pipe 124 (see FIG. 2). The discharge fuel pipe 124 may be made of a flexible resin hose or the like. Also, the discharge fuel pipe 124 may be formed in a bellows shape.

As shown in FIG. 2, the first electric connector portion 38 on the flange main body 28 is electrically coupled to an electric connector for the fuel pump 58 via a first wire harness 126. The second electric connector portion 39 on the flange main body 28 is electrically coupled to the gauge main body 84 of the sender gauge 56 (see FIG. 3) via a second wire harness 128. The first wire harness 126 and the second wire harness 128 are attached to a wiring hook portion, which is integrally formed with an adjacent resin member.

The fuel supply device 20 is extended when being installed in the fuel tank 10. In this state, the joint member 24 is suspended by the flange unit 22 while the pump unit 26 is suspended by the joint member 24. Specifically, the joint member 24 is lowered to its lowermost position (farthest position) with respect to the flange unit 22. Further, the pump unit 26 is rotated in an inclined state downward to right (see the arrow Y1 in FIG. 3) of the joint member 24 (see two-dot chain line 26 in FIG. 3).

Subsequently, the pump unit 26 is inserted in the opening 13 of the fuel tank 10 from its top while the fuel supply device 20 is still in its extended state. The pump unit 26 is mounted on the bottom wall 12 of the fuel tank 10 by being rotated relative to the joint member 24 in a direction opposite to that of being suspended (see the arrow Y2 in FIG. 3) so as to be placed horizontally (see FIG. 2). Further, a rotation limiting mechanism for limiting rotation beyond the horizontal state of the pump unit 26 is provided between the joint member 24 and the pump unit 26.

The standoff portion 41 of the flange main body 28 is then fitted in the opening 13 of the fuel tank 10 as the flange unit 22 is pressed downward against the biasing force of the coil spring 52. In this state, the flange portion 34 of the flange main body 28 is fixed to the upper wall 11 of the fuel tank 10 via fixing means (not shown), such as metal fixtures or bolts (see FIG. 2 and FIG. 3), thereby completing the installation of the fuel supply device 20 into the fuel tank 10.

The pump unit 26 is biased against the bottom wall 12 of the fuel tank 10 due to the biasing force of the coil spring 52 in the installed state of the fuel supply device 20 (see FIG. 2 and FIG. 3). Further, the projections 81 on the cover member 68 abut the bottom wall 12 of the fuel tank 10, thereby ensuring flow of fuel between the cover member 68 and the bottom wall 12. Further, a lower end face 41a of the standoff portion 41 of the flange unit 22 faces the upper end face 46a of the joint main body 46 with a predetermined distance therebetween (see FIG. 3).

Incidentally, the fuel tank 10 may deform, i.e., expand or contract in response to a change in the internal pressure of the tank 10 caused by a change in temperature or a change in the amount of fuel. Consequently, the distance between the upper wall 11 and the bottom wall 12 of the fuel tank 10 may vary (increase or decrease). In this case, the flange unit 22 and the joint member 24 move relative to each other in the upward/downward direction so as to follow the change in the height of the fuel tank 10. Further, when the fuel tank 10 attempts to excessively contract, the standoff portion 41 of the flange main body 28 and the joint main body 46 come in contact with each other so as to serve as a tension rod.

A fuel feed pipe leading to an engine is connected to the fuel outlet port 37 of the flange unit 22. External connectors are each connected to the first electric connector portion 38 or the second electric connector portion 39. A fuel vapor piping member leading to a canister is connected to the evaporation port 36. The canister includes adsorbents (for example, activated carbon) for adsorbing and desorbing fuel vapor generated within the fuel tank 10.

The fuel pump 58 (see FIG. 5) is driven by an external drive power source. The fuel from the interior of the fuel tank 10 that is to pass through the cover member 68 and/or fuel within the fuel storage space 79 of the pump unit 26 is drawn in by the fuel pump 58 via the fuel filter 67 and pressurized. The pressurized fuel discharged from the fuel pump 58 flows into the regulator case 64 via the discharge pipe portion 96 of the pump case 60, and the pressure of the fuel is regulated by the pressure regulator 62. The pressurized fuel having a regulated pressure is supplied to the engine through the fuel outlet port 37 of the flange unit 22 via the discharge fuel pipe 124 (see FIG. 1).

The surplus fuel resulting from regulation of the fuel pressure using the pressure regulator 62 (see FIGS. 4 and 5) is discharged through the discharge pipe portion 118 at the regulator case 64 into the fuel receiving tubular portion 71 of the sub-tank main body 66. Further, a portion of the pressurized fuel discharged from the fuel pump 58 into the discharge pipe portion 96 of the pump case 60 is discharged into the fuel receiving tubular portion 71 of the sub-tank main body 66 via the fuel discharge tube 107. The fuel vapor generated in the fuel tank 10 is discharged into the canister when a fuel vapor control valve of the fuel vapor valve 30 (see FIG. 1) opens.

Figure 6:
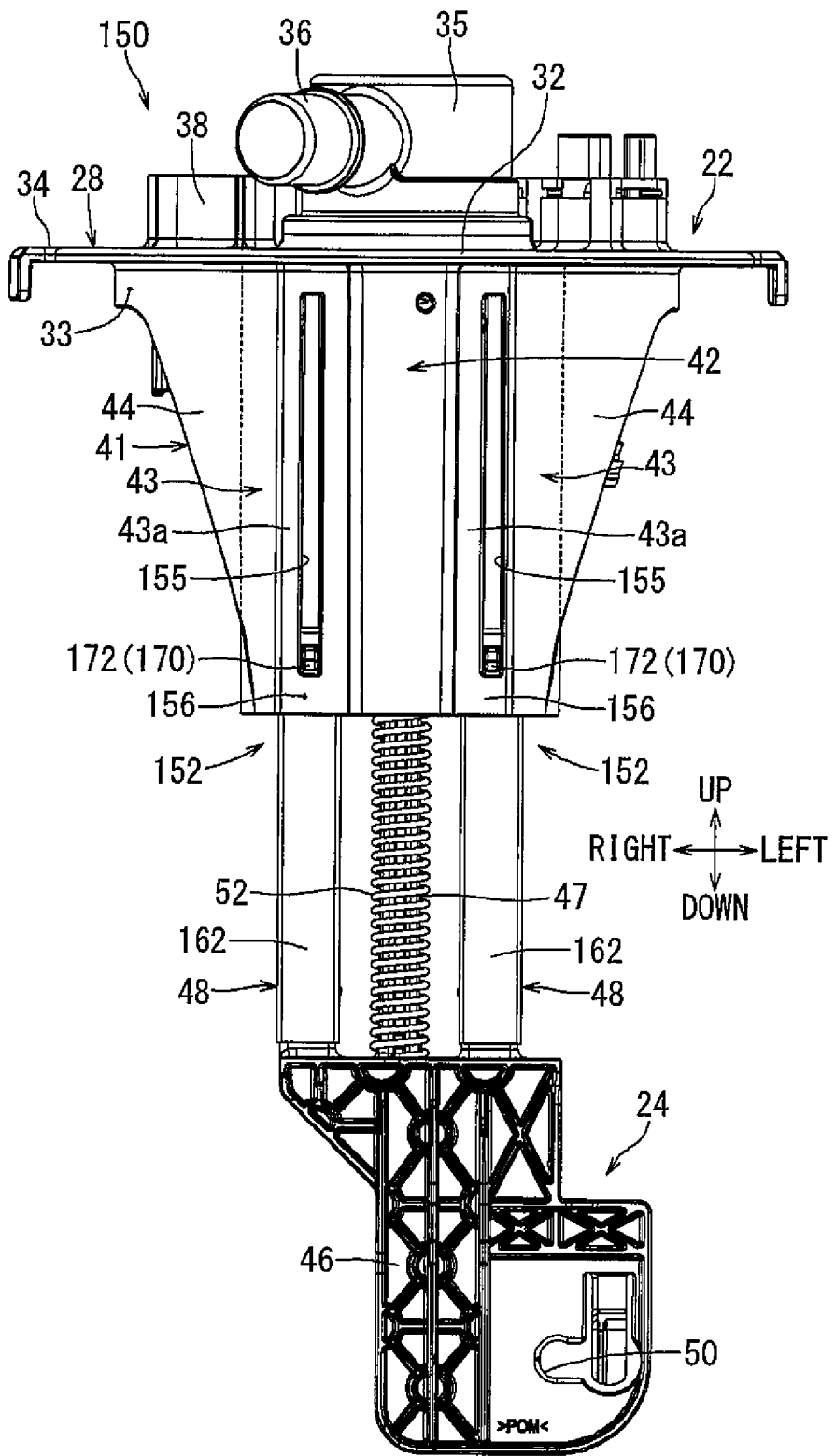
FIG. 6 is a rear view of the cover for the fuel tank of FIG. 1 with a joint member in a suspended state.
Figure 7:
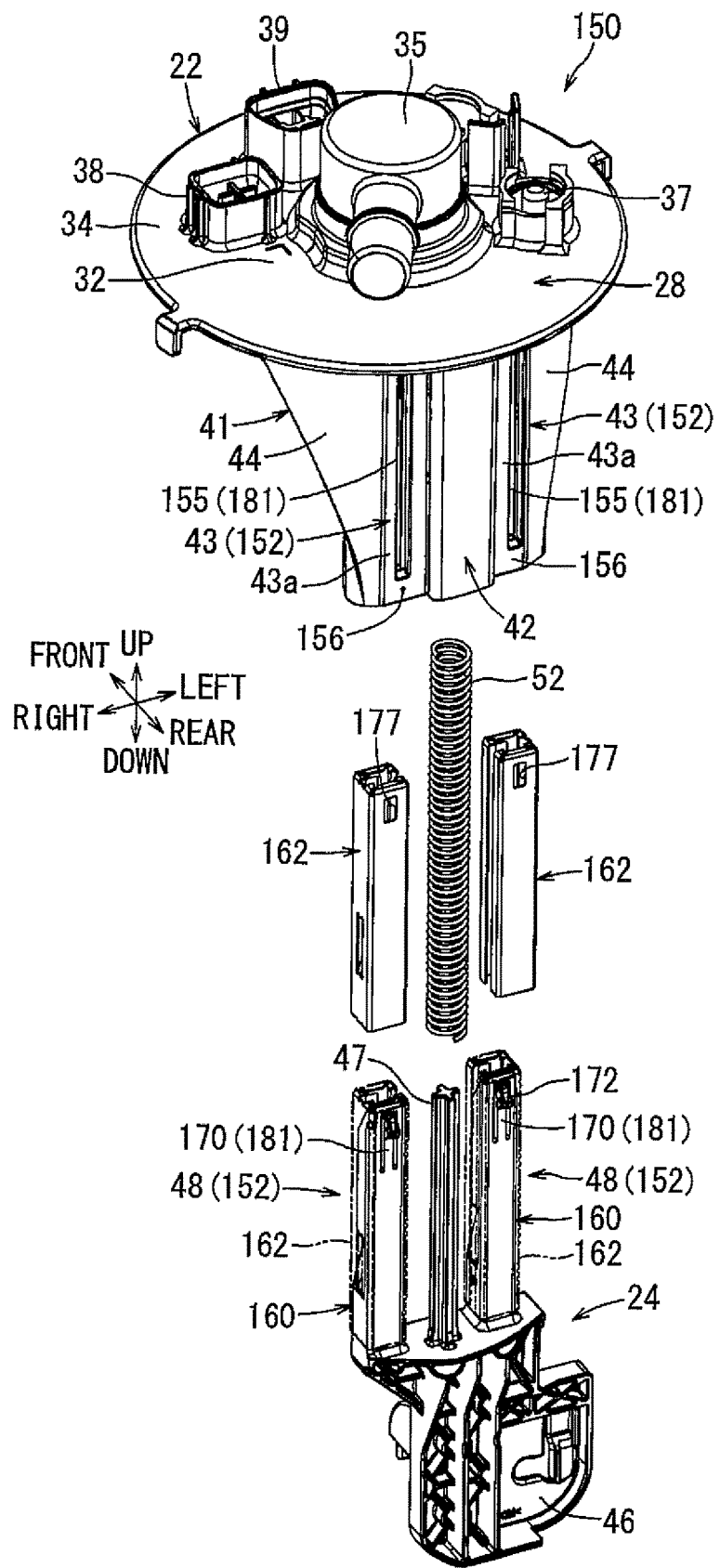
FIG. 7 is a perspective, exploded view of the cover of FIG. 6.

FIG. 6 is a rear view of the cover 150 for the fuel tank 10 with the joint member 24 in a suspended state. FIG. 7 is an exploded, perspective view of the cover 150 for the fuel tank 10. As shown in FIG. 6, the fuel tank cover 150 includes the flange unit 22, the joint member 24, and the coil spring 52. Further, connecting mechanisms 152 includes the side tubular portions 43 of the flange unit 22 and the side columnar portions 48 of the joint member 24. Further, since the left and right connecting mechanisms 152 are generally the same, the left connecting mechanism 152 will be described in detail while the right connecting mechanism 152 will be described briefly or will not be described.

The flange unit 22 corresponds to the "cover member" in the present description. In addition, the joint member 24 corresponds to the "connecting member" in the present description. Further, the joint member 24 and the pump unit 26 correspond to the "in-tank component" in the present description. Still further, the joint main body 46 corresponds to a "connecting member main body" in the present description. Moreover, the side tubular portions 43 correspond to the "tubular portions" in the present description.

Figure 8:
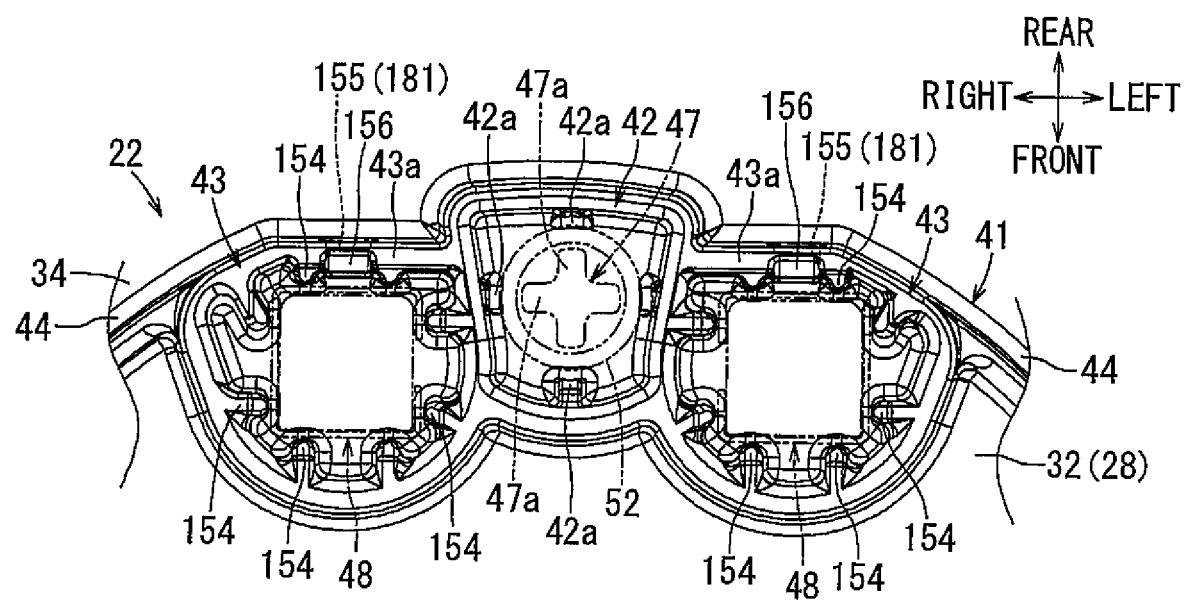
FIG. 8 is a bottom view of the flange unit of FIG. 7 illustrating peripheral parts of the side tubular portions.

FIG. 8 is a bottom view illustrating peripheral parts of the side tubular portions 43 of the flange unit 22. As shown in FIG. 8, the side tubular portions 43 have a substantially cylindrical shape in a bottom view of the flange unit 22. A plurality of (eight in FIG. 8) guiding ribs 154 are provided on an inner surface of the side tubular portions 43. The guiding ribs 154 are formed in straight lines extending in the axial direction of the side tubular portions 43, i.e., in the upward/downward direction (in the direction of the front and rear sides of the sheet in FIG. 8). The guiding ribs 154 are arranged at predetermined distances in a circumferential direction. Two adjacent guiding ribs 154 are formed in one set so as to abut or be proximal to two sides of each of projecting corner of the side columnar portions 48.

As shown in FIG. 6, elongated engagement holes 155 extend in the upward/downward direction and are formed on rear side walls 43a of the side tubular portions 43. The edges on the lower end sides of the engagement hole portions 155 may also be referred to herein as hole lower edge portions 156.

As shown in FIG. 8, the center tubular portion 42 is formed in a substantially rectangular columnar shape and is positioned between the side tubular portions 43. A plurality of (four front, rear, left, and right in FIG. 8) spring guiding ribs 42a are disposed along the inner surface of the center tubular portion 42. The spring guiding ribs 42a extend linearly (i.e., straight) in the axial direction of the center tubular portion 42 (i.e., in the upward/downward direction). The center tubular portion 42 and both side tubular portions 43 may be made of resin so as to be integrally formed with the flange main body 28.

Figure 9:
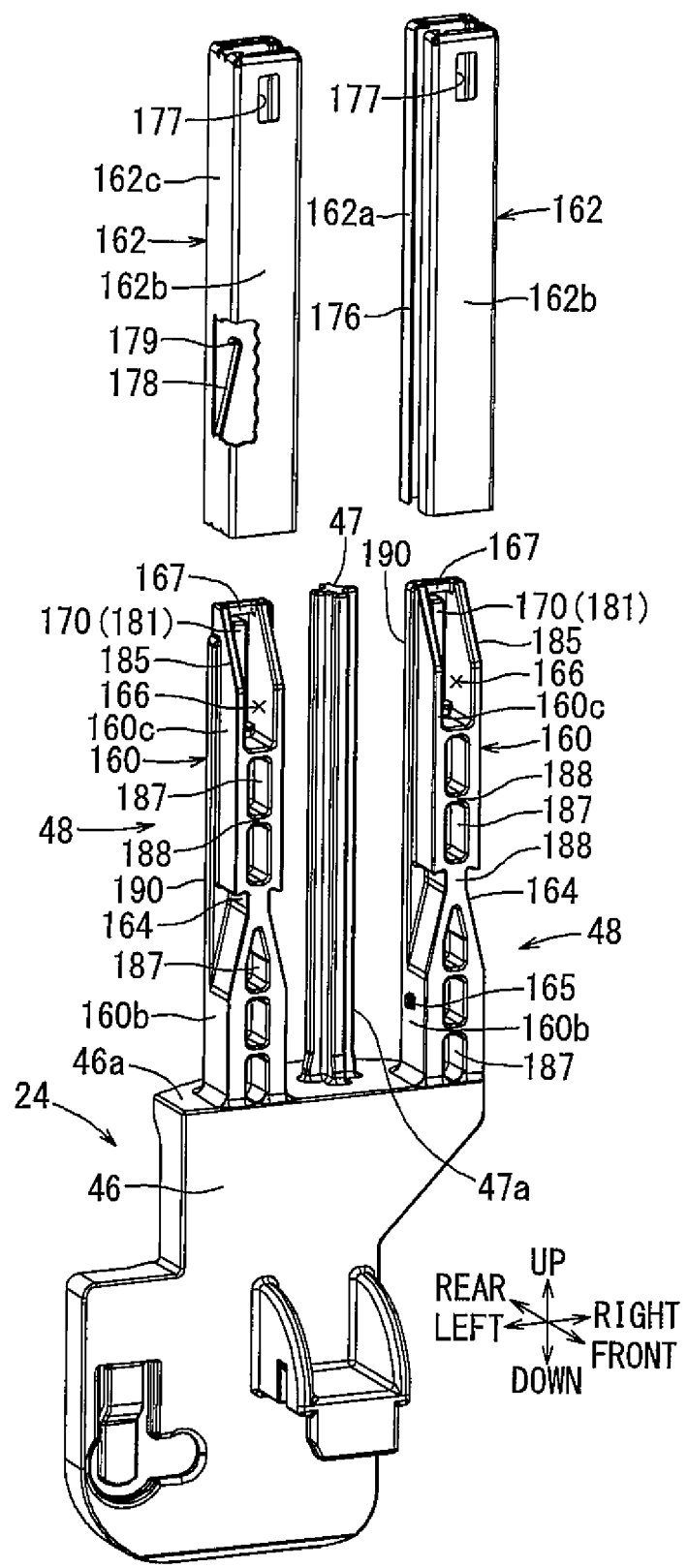
FIG. 9 is a perspective, exploded view of the joint member of FIG. 6.
Figure 14:
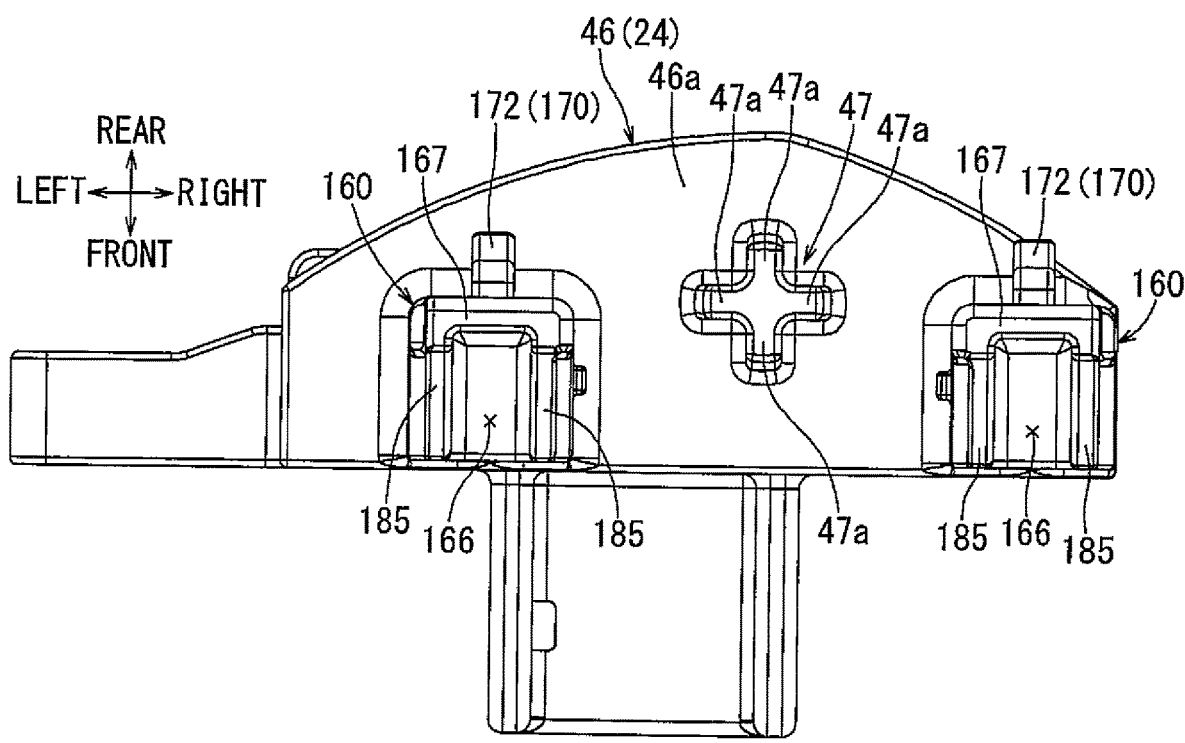
FIG. 14 is a plan view of the joint main body of FIG. 1.

FIG. 9 is a perspective, exploded view of the joint member 24. FIG. 14 is a plan view the joint main body 46. As shown in FIG. 9, the spring guide 47 extends upward from the center of the upper end face 46a of the joint main body 46. The spring guide 47 has a plus (+) shape in a plan view (see FIG. 8) so as to include four front, rear, right, and left rib-like parts 47a (see FIG. 14).

Figure 10:
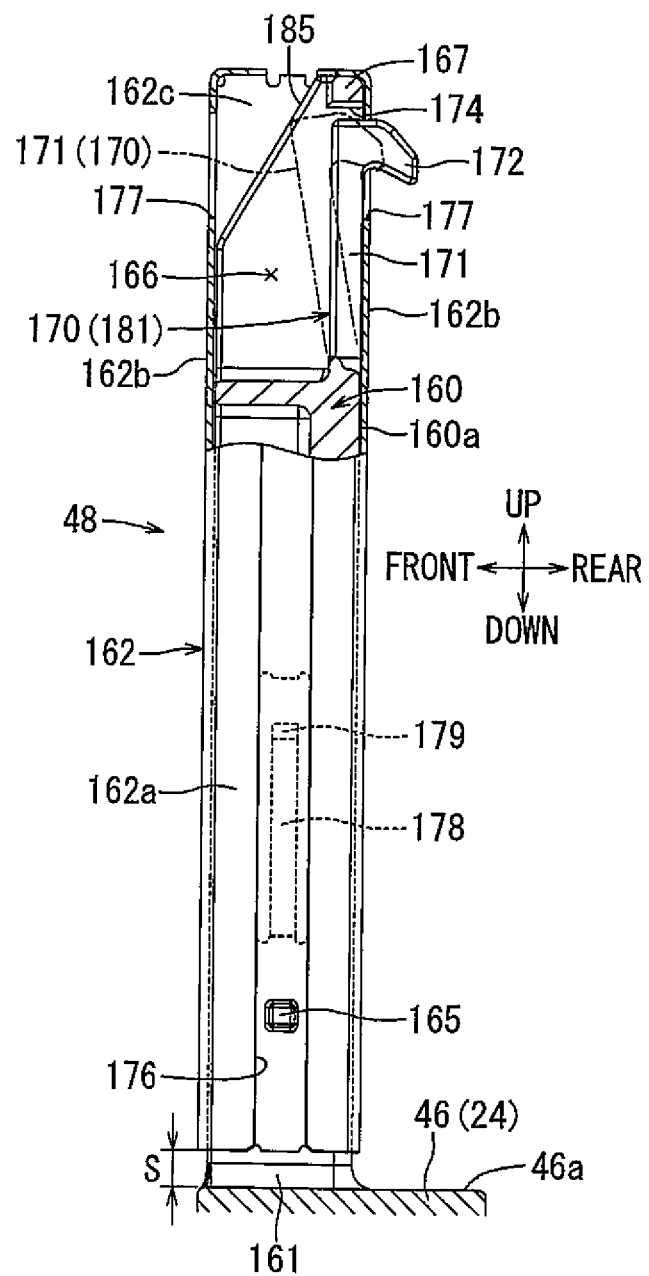
FIG. 10 is a side, partial cutaway view of one side columnar portion of FIG. 9.
Figure 11:
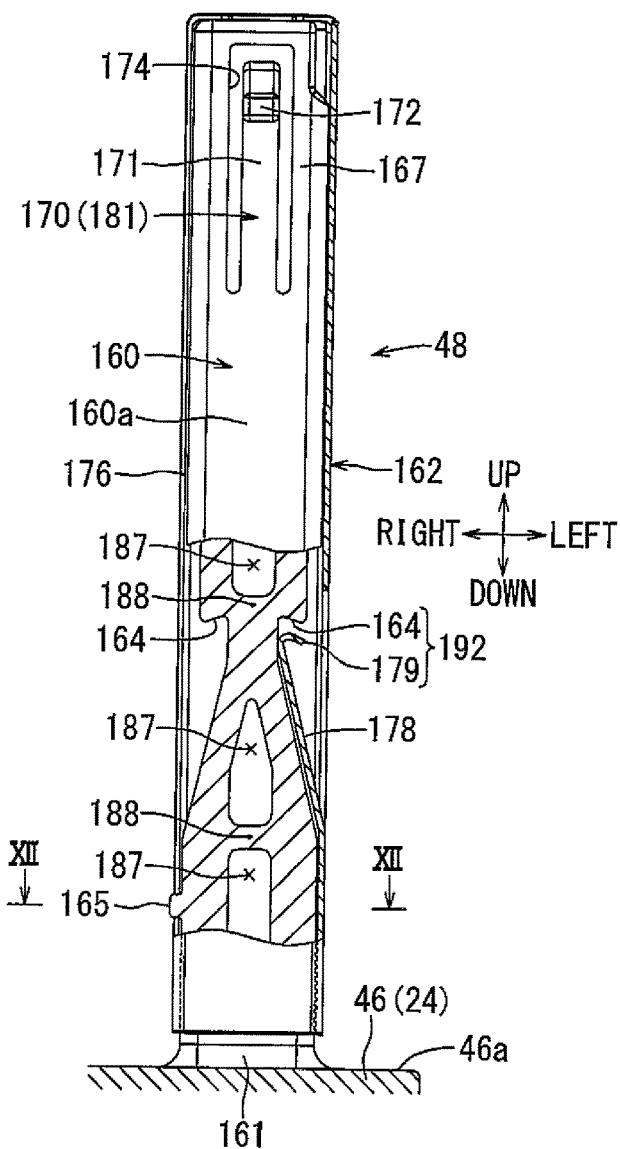
FIG. 11 is a rear, partial cutaway view of one side columnar portion of FIG. 9.
Figure 12:
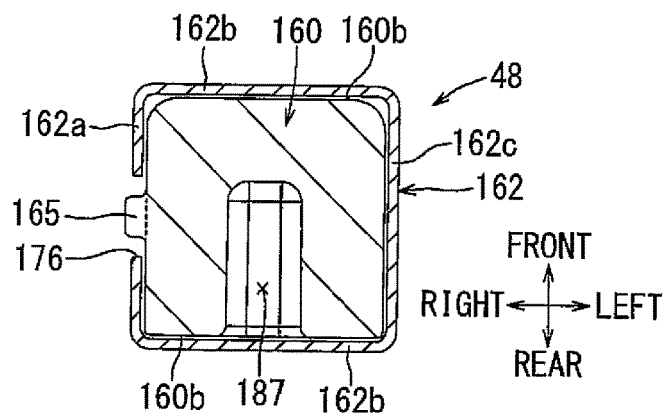
FIG. 12 is a cross-sectional view of the side columnar portion of FIG. 11 taken along line in FIG. 11.

As shown in FIG. 9, each side columnar portion 48 includes a support column portion 160 as a main body and a retainer 162 configured to cover an outer periphery of the support column portion 160. FIG. 10 is a side, partial cutaway view of the side columnar portion 48. FIG. 11 is a rear view of the side columnar portion 48. FIG. 12 is a cross-sectional view of the side columnar portion 48 taken along line in FIG. 11.

The support column portion 160 has a substantially square columnar shape on the joint main body 46 of the joint member 24. Two substantially U-shaped lock grooves 164 are provided on the lower portion of both the left and right sides of the support column portion 160 in a symmetrical manner in the rightward/leftward direction (see FIG. 11). Further, a rectangular alignment projection 165 located below the lock groove 164 extends from a lower end part of an inner side face of each support column portion 160 (a right side face of the left support column portion 160 or a left side face of the right support column portion 160). A recessed groove 166, which may have a rectangular shape with its front and top sides opened, is formed on the upper end of the support column portion 160. An engagement piece 170 is provided on a rear side wall 167 of the recessed groove 166 (see FIG. 10 and FIG. 11). It should be noted that the support column portion 160 corresponds to the "columnar portion" in the present description.

As shown in FIG. 10, the engagement piece 170 includes an engagement piece main body 171 extending upward and being cantilevered from the lower end side, and a hook-like engagement claw portion 172 formed on a tip end (upper end) of the engagement piece main body 171. A rear surface of the engagement piece main body 171 is coplanar with the rear surface 160a of the support column portion 160, including the rear side wall 167. The engagement claw portion 172 protrudes rearward from the rear surface of the rear side wall 167.

As shown in FIG. 11, the engagement piece main body 171 is formed by forming a substantially inverted U-shaped opening groove 174 in the rear side wall 167. The engagement piece main body 171 is elastically deformable, i.e., flexibly deformable in an engagement releasing direction of the engagement claw portion 172, i.e., in the direction entering the recessed groove 166 (forward direction) (see two-dot chain line 171 in FIG. 10).

As shown in FIG. 9, a front-down inclined surface part 185 is formed at an upper part of each of right and left side walls of the recessed groove parts 166 of the support column portions 160. Each inclined surface part 185 is inclined obliquely downward from the upper end part on the rear side (the side of the engagement claw portion 172) to the lower end part on the front side (the side opposite to the engagement claw portion 172).

A plurality of vertical groove-shaped recessed parts 187 (five are illustrated in FIG. 9) are positioned on the front side surface of each support column portion 160. The recessed parts 187 are opened forward. The recessed parts 187 are vertically arranged at predetermined intervals in the upward/downward direction. Reinforcing rib parts 188 are formed between the vertically adjacent recessed parts 187.

A projecting rib part 190 extends in the upward/downward direction and is provided on the rear side edge part of each right and left side surfaces of the support column portions 160. Each projecting rib part 190 extends from the lower end part of the lock groove 164 to the upper end part of the support column portion 160 or to a position proximal the upper end part of the support column portion 160. Both right and left side surfaces 160c above the upper end of the lock groove 164 in each support column portion 160 are disposed at positions deeper than both right and left side surfaces 160b of the lower end parts of the support column portion 160, respectively. The alignment projections 165 are disposed on the inner side surfaces 160b (the right side surface 160b of the left side support column portion 160 and the left side surface 160b of the right side support column portion 160) out of the side surfaces 160b at the lower end parts of the support column portions 160.

The spring guide 47 and the support column portions 160 are integrally formed with the joint main body 46 by molding, and thus, are made of resin. The joint main body 46 is formed by die removal in the frontward/rearward direction. That is, the joint main body 46 is formed of a resin using a mold including, for example, a fixed mold disposed on the front side and a movable mold disposed on the rear side thereof and capable of moving in the front-rear direction. Therefore, both side columnar portions 48 are formed by die removal in the frontward/rearward direction, which is orthogonal to their axes. The spring guide 47 is formed by die removal in the same direction as the mold release direction of both side columnar portions 48.

As shown in FIG. 9, the retainers 162 have a substantially square tubular shape and may be formed by bending a metal (for example, stainless steel) plate material by press molding. The retainers 162 are sized so as to be fitted on the support column portions 160. A counter recess 176 extending axially at the center of the side plate 162a over the whole length thereof and having a predetermined width is provided between both circumferential end edges of the retainer 162 (see FIG. 12). The counter recess 176 is positioned to correspond to the alignment projection 165 on the support column portion 160. The counter recess 176 corresponds to the "slit" in the present description.

Window holes 177 have a rectangular shape and are symmetrically provided in the centers of the upper ends of both side plates 162b adjacent to the side plate 162a on the side of the counter recess 176 of the retainers 162 (see FIG. 10). A locking piece 178 is formed at the lower portion of a side plate 162c on the side opposite to the counter recess 176 of each retainer 162, and are formed in an obliquely cut and raised manner in the retainer 162 (see FIG. 11). The locking piece 178 is formed in a cantilever manner with a lower end as a base end and an upper end defining a locking end 179. The locking end 179 is bent so as to be folded back toward the side opposite to the cut and raised direction. Further, the upper end of the retainer 162 is bent such that the upper end opening is narrowed. The retainer 162 corresponds the "tubular member" in the present description. The locking end 179 corresponds to the "locking claw portion" in the present description.

Figure 15:
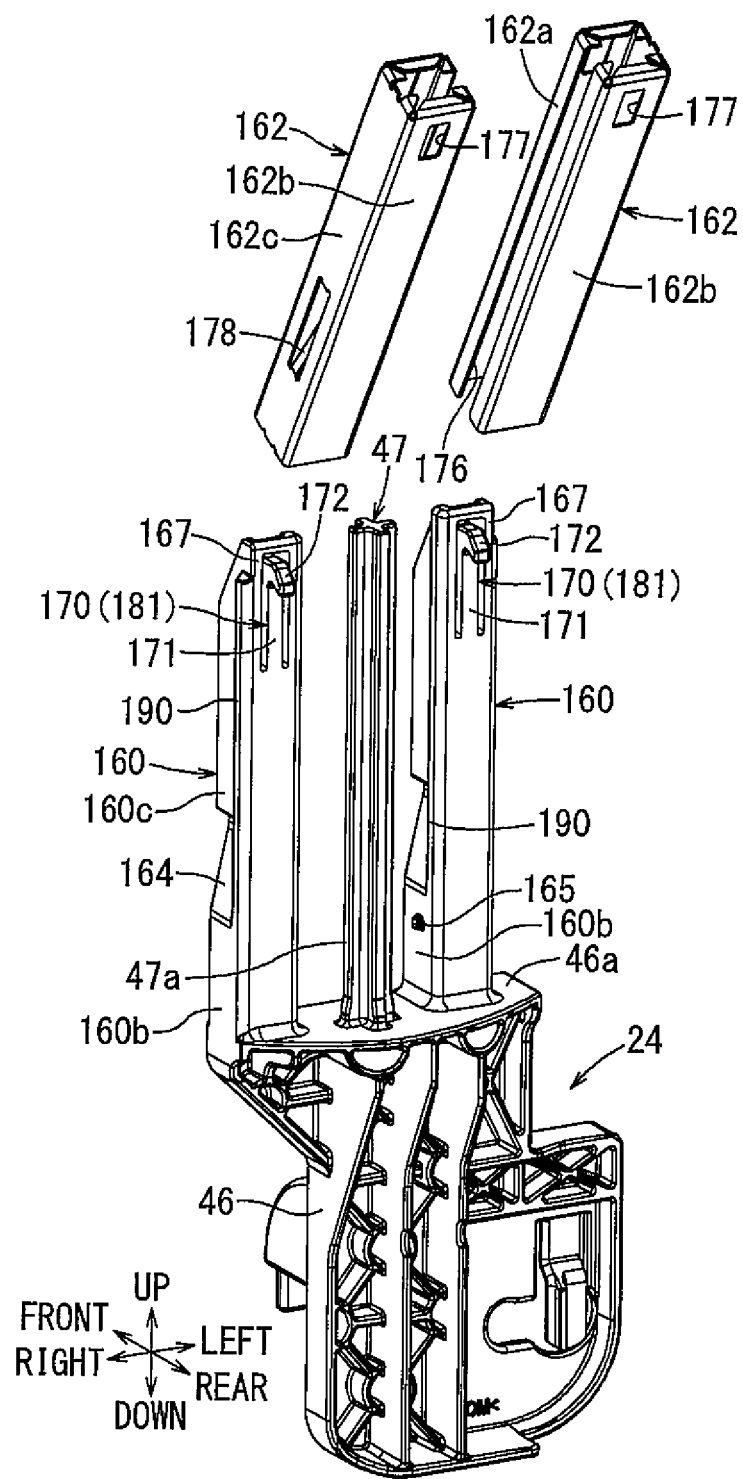
FIG. 15 is a perspective view of an inclined orientation of the retainer of FIG. 9 immediately before being fitted to a support columnar portion.

As shown in FIG. 10, the retainer 162 is slid over the support column portion 160. More specifically, as shown in FIG. 15, the retainer 162 is first shifted to an inclined posture where the upper end part of the retainer 162 is inclined obliquely backward such that the counter recess 176 of the retainer 162 and the alignment projection 165 of the support column portion 160 confront each other.

Figure 16:
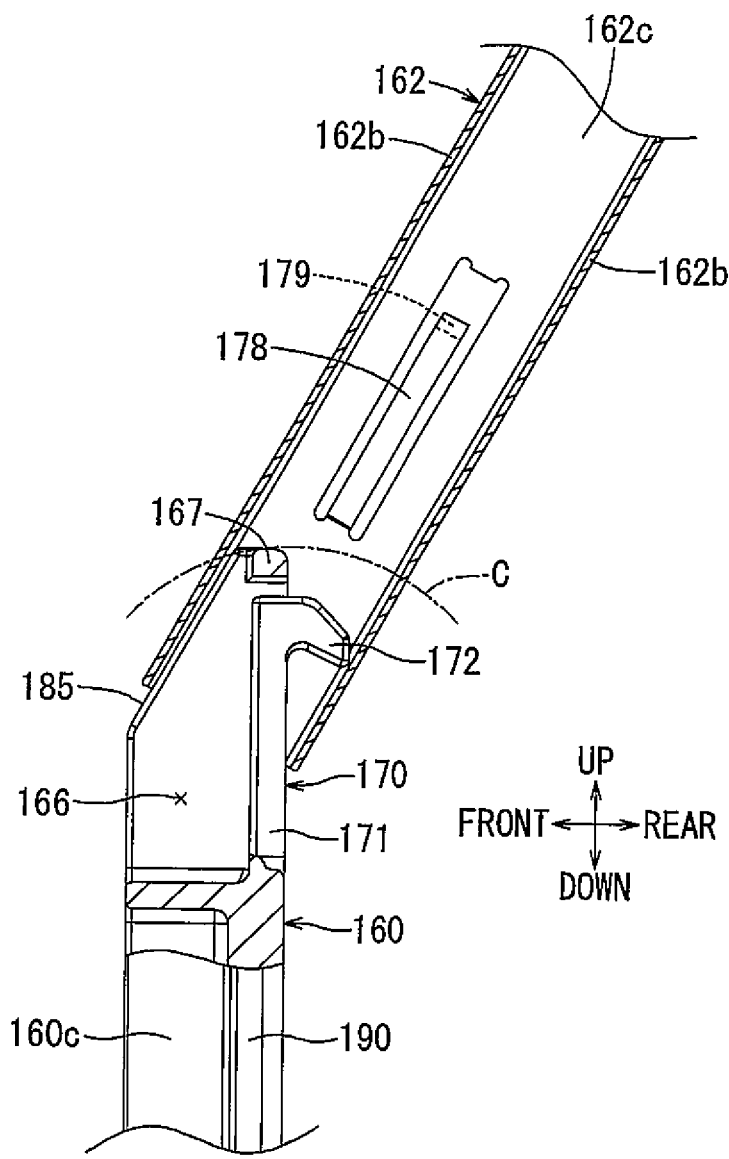
FIG. 16 is a partially cross-sectional side view of the retainer of FIG. 15 in the inclined orientation as it is fitted to the support columnar portion.

Subsequently, as shown in FIG. 16, the lower end part of the retainer 162 is fitted to the upper end part of the support column portion 160 by sliding one of the side plates 162b (on the front oblique upward side) along the inclined surface part 185 of the support column portion 160 while keeping the retainer 162 in the inclined posture. As a result, the engagement claw portion 172 of the engagement piece 170 is disposed in the lower end part of the retainer 162 (i.e., inside the rear side plate 162b). In this state, the lower end part of the side plate 162b on the other side (rear oblique downward side) of the retainer 162 abuts or is positioned near the rear side surface of the rear side wall 167 of the support column portion 160, and is disposed below the lower end part of the inclined surface part 185 of the support column portion 160 by a predetermined amount. When a circular arc C, which is centered at the lower end of the inner side surface of the side plate part 162b on the other side (rear oblique downward side) and passes through the upper end of the rear side wall 167 farthest from the center, is drawn, the locking piece 178 (more specifically, the lower end of the locking piece 178 closest to the lower end of the inner side surface of the side plate 162b) is positioned outside the circular arc C.

Figure 17:
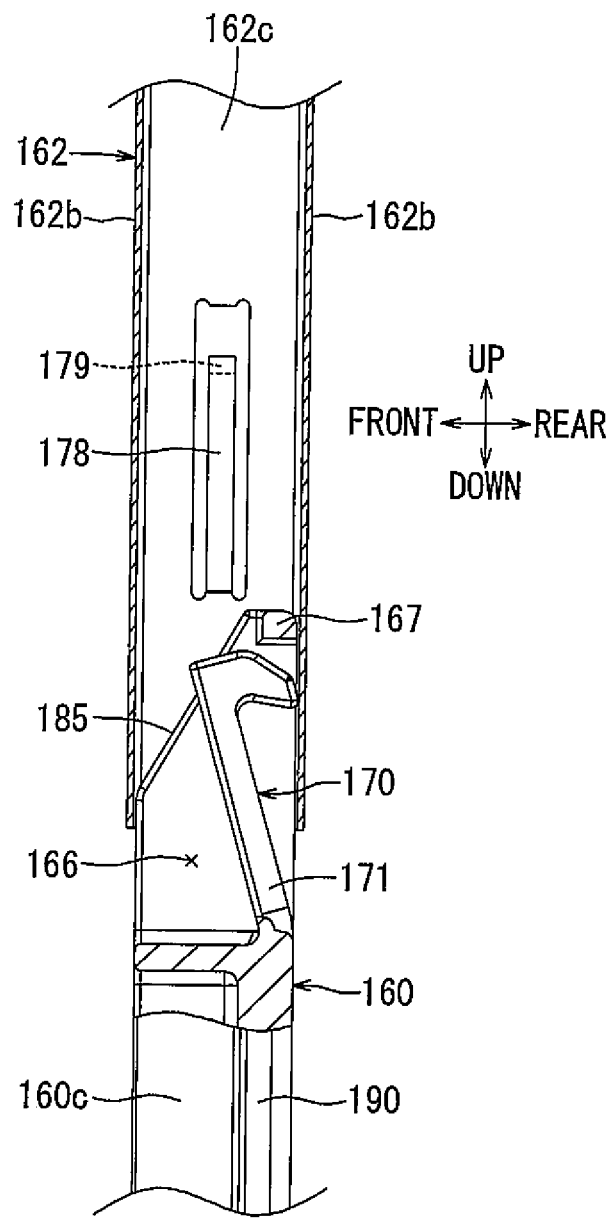
FIG. 17 is a partially cross-sectional side view of the retainer of FIG. 15 as it is shifted to a standing orientation.

From this state, as shown in FIG. 17, the retainer 162 is transitioned to the standing orientation with the retainer 162 coaxially aligned with the support column portion 160, by rotating the retainer 162 forward with the lower end part of the side plate 162b on the other side (rear oblique downward side) being used as a fulcrum. This causes the engagement claw portion 172 of the engagement piece 170 to be pushed by the rear side plate 162b of the retainer 162. Accordingly, the engagement piece 170 is elastically deformed in the engagement release direction. In this state, the lower end part of the other (front) side plate 162b of the retainer 162 faces the front side surface of the support column portion 160 at a location below the lower end part of the inclined surface part 185 of the support column portion 160.

Since the locking piece 178 of the retainer 162 is positioned outside the circular art C (see FIG. 16), the locking piece 178 does not come into contact with (is not interfered by) the support column portion 160 while transitioning the retainer 162 from the inclined position to the standing position. In other words, the locking piece 178 is disposed at a position where it does not come into contact with the support column portion 160 when transitioned from the inclined posture to the standing posture.

Subsequently, the retainer 162 is slid downward along the support column portion 160 while maintaining the standing posture. At this moment, the retainer 162 is fitted to the support column portion 160 in a normal mounting state (see FIGS. 10 to 12) by moving the alignment projection 165 of the support column portion 160 in the counter recess 176 of the retainer 162, so that its fitting process is completed. When the fitting process of the retainer 162 is completed, the outer periphery of the support column portion 160 is covered by the retainer 162.

When the engagement piece 170 is elastically restored, which occurs simultaneously with the completion of the fitting process of the retainer 162, the engagement claw portion 172 of the engagement piece 170 projects rearward through the window hole 177 of the retainer 162 (see FIG. 10). The engagement claw portion 172 projects rearward from the window hole 177. The retainer 162 is positioned in the frontward/rearward direction and the leftward/rightward direction with respect to the support column portion 160.

Figure 18:
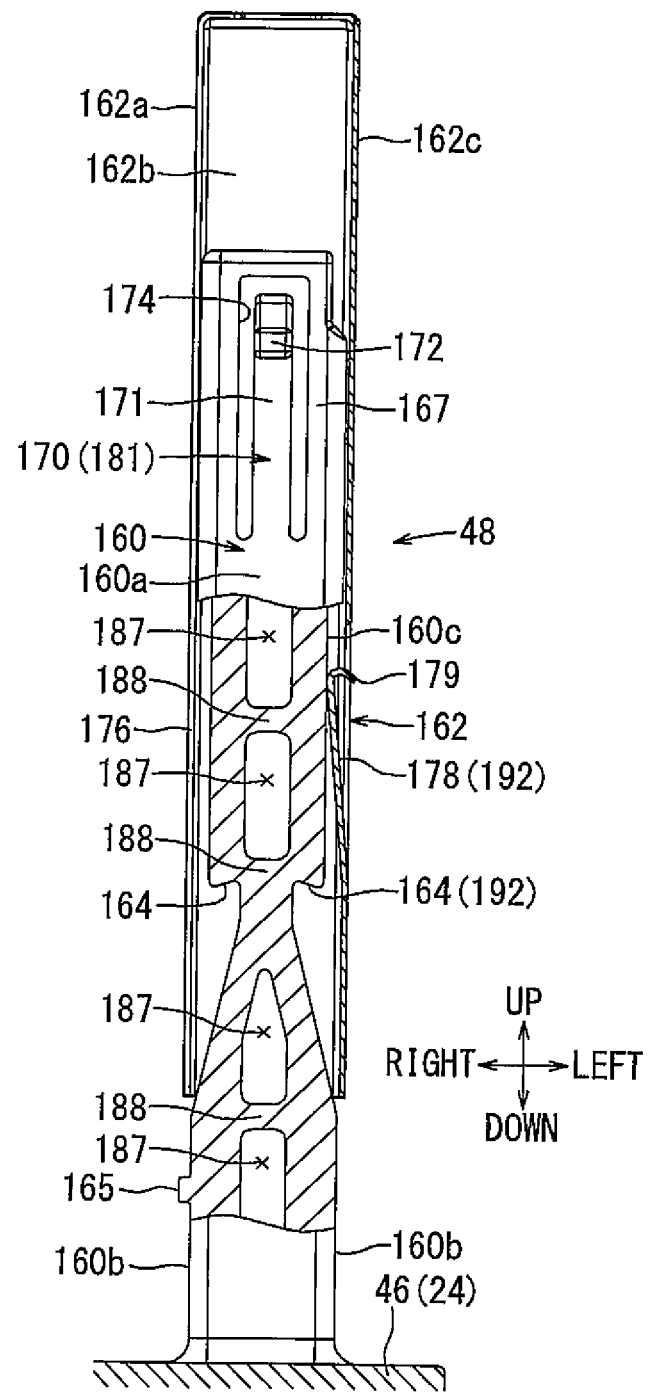
FIG. 18 is a partially cross-sectional rear view illustrating the retainer of FIG. 15 as it is slid into the support columnar portion.

When the retainer 162 is slid downward along the support column portion 160 while maintaining the standing posture, the locking piece 178 is pushed by the side surface 160c of the support column portion 160, utilizing the elasticity of the locking piece 178 (see FIG. 18). When the locking piece 178 is elastically restored, which occurs simultaneously with the completion of fitting of the retainer 162, the locking end 179 of the locking piece 178 is locked in the lock groove 164 (see FIG. 11). Accordingly, the retainer 162 is attached to the support column portion 160 in a retaining state. A mounting snap fit 192 for attaching the retainer 162 to the support column portion 160 comprises the support column portion 160 having the lock groove 164 and the locking piece 178 having the locking end part 179. In the present embodiment, a predetermined gap S between the upper end face 46a of the joint main body 46 and a lower end surface of the retainer 162 is set so as to expose a base end part 161 of the support column portion 160 in a fitting completion state of the retainer 162 with respect to the support column portion 160 (see FIG. 10).

The spring guide 47 fitted with the coil spring 52 is inserted into the center tubular portion 42 (see FIG. 8). The rib-like parts 47a of the spring guide 47 abut or are positioned near the inner peripheral surface of the coil spring 52. The spring guiding ribs 42a abut or are proximal the outer peripheral surface of the coil spring 52. The coil spring 52 is vertically held by the spring guide 47 and the spring guiding ribs 42a.

Figure 13:
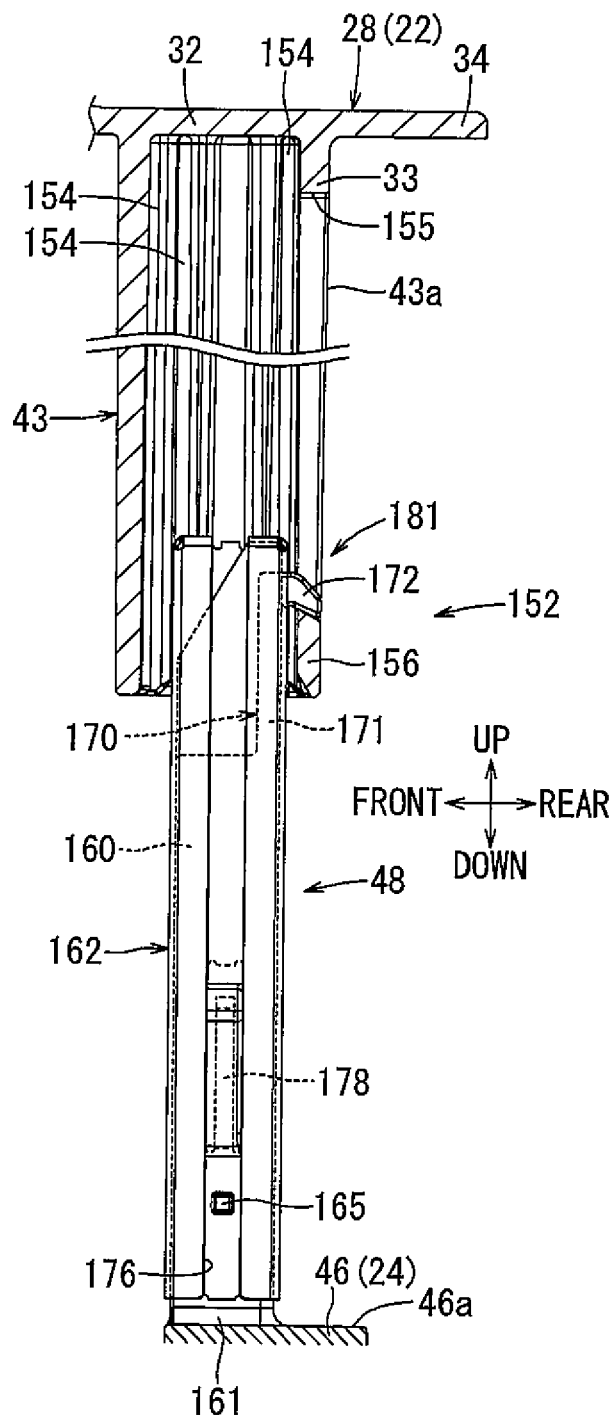
FIG. 13 is a side, partial cutaway view of one side columnar portion and the corresponding side tubular portion of FIG. 6 with the side columnar portion in a suspended state with respective to the side tubular portion.

As shown in FIG. 13, the side columnar portion 48 is inserted into the side tubular portion 43 from below. At this time, the engagement claw portion 172 of the engagement piece 170 interferes with the hole lower edge portion 156 of the engagement hole 155 of the side tubular portion 43. The engagement claw portion 172 then moves over the hole lower edge portion 156 due to the elastic deformation (flexural deformation) of the engagement piece 170. Accordingly, the engagement claw portion 172 is engaged in the engagement hole 155 of the side tubular portion 43 so as to be movable within a predetermined range in the upward/downward direction. That is, the side columnar portion 48 is connected to the side tubular portion 43 so as to be movable and suspendable in the upward/downward direction. Each guiding rib 154 (see FIG. 8) in the side tubular portion 43 is brought into contact with or comes proximal to a side surface of each projected corner part of the retainer 162 of the side columnar portion 48, so that the side columnar portion 48 is held coaxially with the side tubular portion 43.

When the joint member 24 is suspended from the flange unit 22, the engagement claw portion 172 of the engagement piece 170 of the support column portion 160 is brought into contact with the hole lower edge portion 156 of the engagement hole 155 of the side tubular portion 43. Thus, the joint member 24 is prevented from being detached from the flange unit 22 in the suspended state. A suspension snap fit 181, having a structure in which the support column portion 160 can be connected to the side tubular portion 43 movably and suspendably in the upward/downward direction, comprises the side tubular portion 43 having the engagement hole 155 and the engagement piece 170 having the engagement claw portion 172. The engagement claw portion 172 of the engagement piece 170 is formed such that a tip part thereof does not protrude from the rear side surface of the side tubular portion 43.

According to the fuel tank cover 150 described above, the outer periphery of the resin-made support column portion 160 of the joint member 24 is covered by the metal retainer 162. As a result, the rigidity of the support column portion 160 is increased such that the base end part 161 (see FIG. 13) of the support column portion 160 defines the weakest portion of the support column portion 160 as it has a lower rigidity than the other parts of the support column portion 160. Therefore, when an external force (especially an external force in the frontward/rearward direction) is applied to the fuel tank cover 150 (e.g., due to a vehicle collision or the like), stress from the external force is concentrated on the base end part 161 of the support column portion 160. This allows the joint member 24 to deform so as to be bent at the base end part 161. Accordingly, the deformation rigidity at the time of collision is set by the support column portion 160. The rigidity of the support column portion 160 is increased by the retainer 162, so as to obtain the necessary rigidity during normal operations. Therefore, deformation of the flange main body 28 of the flange unit 22 due to an external force can be reduced without requiring a complicated balancing between the necessary rigidity of the support column portion 160 for normal conditions (the strength of the support column portion 160 required for withstanding normal loads) and the deformation rigidity of the support column portion 160 at a time of collision (the strength of the stress concentration part damaged by an excessive load such as a vehicle collision, that is, the strength of the base end part 161).

Since the metal retainer 162 is interposed between the side tubular portion 43 and the support column portion 160, the sliding performance between the side tubular portion 43 and the support column portion 160 is improved. This may reduce the generation of abnormal sounds caused by sliding contact between the resin products. That is, by using the retainer 162, deformation of the flange unit 22 due to an external force is beneficially reduced and generation of abnormal sounds due to sliding contact between the resin of the side tubular portion 43 and the resin of the support column portion 160 is beneficially reduced.

When the retainer 162 is fitted to the support column portion 160, the retainer 162 is changed to the standing posture from the inclined posture, which is a state where the lower end part of the retainer 162 is fitted to the upper end part of the support column portion 160 so as to be along the inclined surface part 185. Thus, the engagement piece 170 is elastically deformed in the engagement release direction. Therefore, it is possible to save the labor of pushing the engagement piece 170 in the engagement release direction, which would be required if the retainer 162 were to be fitted to the support column portion 160 while maintaining the standing posture. More specifically, if the retainer 162 were to be fitted to the support column portion 160 while keeping the standing posture, the retainer 162 would interfere (abut) with the engagement claw portion 172 of the engagement piece 170. This would prevent the progress of the fitting. Therefore, it would be necessary to push the engagement claw portion 172 in the engagement release direction of the engagement piece 170. However, according to this embodiment, by utilizing the posture change of the retainer 162, the labor of separately pushing the engagement claw portion 172 in the engagement release direction of the engagement piece 170 is reduced and/or eliminated.

The retainer 162 fitted to the support column portion 160 can be attached in the retaining state by locking the locking piece 178 to the lock groove 164 of the mounting snap fit 192.

Since the locking piece 178 of the retainer 162 is arranged outside the circular arc C (see FIG. 16), the contact (interference) of the locking piece 178 with respect to the support column portion 160 can be avoided while the posture of the retainer 162 fitted to the upper end part of the support column portion 160 is transitioned from the inclined posture to the standing posture. Thus, the retainer 162 can be smoothly changed from the inclined posture to the standing posture.

When the retainer 162 is fitted to the support column portion 160 in a state in which the counter recess 176 of the retainer 162 and the alignment projection 165 of the support column portion 160 correspond with each other, the alignment projection 165 may be moved in the counter recess 176. As a result, the retainer 162 can be fitted to the support column portion 160 in a normal attachment state.

When the retainer 162 is fitted to the support column portion 160 in a state in which the alignment projection 165 of the support column portion 160 does not correspond to the counter recess 176 of the retainer 162, the retainer 162 interferes (abuts) with the alignment projection 165. As a result, the progress of completely fitting of the retainer 162 is prevented. This suppresses erroneous attachment of the retainer 162 to the support column portion 160. Further, in a case of an attempted erroneous attachment, the fitting of the retainer 162 to the support column portion 160 may be attempted again.

The counter recess 176 of one retainer 162 is directed toward the side of the other retainer 162 (see FIG. 9). Thus, an expansion deformation of the retainer 162 due to an external force applied from the outside in the rightward/leftward direction under vehicle collision conditions or the like can be reduced, thereby inhibiting the breakage of the support column portion 160 or the like.

The support column portion 160 is formed by die removal in a direction orthogonal to the axis of the support column portion 160, that is, in the frontward/rearward direction. Therefore, as compared with a case where the support column portion 160 is formed by die removal in the axial direction, it is possible to perform corrections to the mold, such as engraving, with respect to inclination of the support column portion 160 caused by the resin molding process. Further, since a plurality of the recessed parts 187 are formed on the support column portion 160 as hollow parts, molding defects of the support column portion 160, such as shrinkage, can be reduced. Further, since the reinforcing rib parts 188 are formed between the recessed parts 187, the strength of the support column portion 160 is increased.

The spring guide 47 is formed by die removal in the same direction as the mold release direction of the support column portions 160. Accordingly, the spring guide 47 can be formed simultaneously with the support column portions 160.

A set of two coupling mechanisms 152, each connecting the flange unit 22 to the joint member 24, is provided on each right and left side. Therefore, when the flange unit 22 is firmly lifted, the stress applied to the hole lower edge portions 156 of the engagement holes 155 of the suspension snap fits 181 and the engagement pieces 170 of the suspension snap fits 181 can be distributed to both right and left coupling mechanisms 152.

In addition, the lock grooves 164 are symmetrically formed on the two support column portions 160 in the rightward/leftward direction, and the window holes 177 are symmetrically formed on each retainer 162 in the frontward/rearward direction. Accordingly, common retainers 162 can be fitted to both right and left support column portions 160. Further, since the support column portions 160 themselves are symmetrically formed, the retainer 162 can be fitted to the support column portion 160 in a state where the orientation of the counter recess 176 is reversed by omitting the alignment projection 165.

The apparatus and methods disclosed herein are not limited to the embodiments described above, and various modifications are possible. For example, the embodiments disclosed herein is not limited to the fuel supply device 20 of a vehicle, such as an automobile, but may be applied to other fuel supply devices. The joint member 24 may be fixed to a member on the pump unit 26 side. Further, the coupling mechanisms 152 connecting the flange unit 22 to the joint member 24 are not limited to a set of two, right and left, but may be a set of one or a set of three or more. The shape of the support column portion 160 is not limited to a prismatic shape, but may instead be a round columnar shape. A tubular member having no slit may be used for the retainer 162. The spring guide 47 and the support column portion 160 may be formed in a shape capable of being formed by die removal in the direction orthogonal to their axes, and the shapes thereof may be appropriately changed. The spring guide 47 and the support column portions 160 may be separately formed.

The disclosure of the apparatus and methods herein has been made in various aspects in the present description. A first aspect of the techniques is a cover for a fuel tank includes a cover member closing an opening of the fuel tank, and a connecting member configured to be connected to the cover member movably in an upward/downward direction. The cover member includes a tubular portion made of a resin and extending in the upward/downward direction. The connecting member includes a columnar portion made of a resin and extending in the upward/downward direction. The columnar portion is inserted into the tubular portion movably in the upward/downward direction. A tubular member made of a metal is provided to substantially cover an outer circumferential surface of the columnar portion.

In accordance with the first aspect, the outer circumferential surface of the columnar portion is covered by the tubular member by fitting the metallic tubular member to the resin-made columnar portion of the connecting member. Thereby, the rigidity of the columnar portion is increased such that a base end part of the columnar portion becomes the relatively weak portion of the columnar portion with a rigidity that is lower than the remainder of the columnar portion. Therefore, when an external force is applied to the cover for the fuel tank, the stress due to the external force is concentrated on the base end part of the columnar portion. This allows the connecting member to be deformed at the base end part of the columnar portion. Accordingly, the deformation rigidity at the time of collision is set by the columnar portion, and the necessary rigidity during the normal time is set by using the tubular member to increase the rigidity of the columnar portion. Therefore, deformation of the cover member due to an external force can be reduced without requiring the columnar portion to have the troublesome balancing of the necessary rigidity during the normal time and the deformation rigidity at the time of collision.

A second aspect is the cover for the fuel tank of the first aspect, wherein the columnar portion is connected to the tubular portion by a suspension snap fit mechanism so as to be movable and suspendable in the upward/downward direction. The suspension snap fit mechanism includes the tubular portion having an engagement hole and an engagement piece formed on the columnar portion. The engagement piece is arranged near an upper end of the columnar portion and includes an engagement claw portion, which is configured to be engaged with the engagement hole via elastic deformation. An upper end part of the columnar portion includes an inclined surface part capable of fitting the tubular member to the columnar portion from above in an inclined posture such that the engagement claw portion is disposed in a lower end part of the tubular member.

In accordance with the second aspect, the engagement piece is engaged with the engagement hole of the suspension snap fit mechanism. This allows the columnar portion of the connecting member to be connected to the tubular portion of the cover member, so as to be movable and suspendable in the vertical direction. When the tubular member is fitted to the columnar portion, first, the lower end part of the tubular member is fitted to the upper end part of the columnar portion in an inclined posture along the inclined surface part. In this position, the engagement claw portion of the engagement piece is disposed in the lower end part of the tubular member. By transitioning the posture of the tubular member from this state to a standing posture, where the tubular member is concentric aligned with the columnar portion, the engagement piece is elastically deformed in the engagement release direction. Subsequently, the columnar portion can be fitted into the tubular member by sliding the tubular member downward along the columnar portion. Therefore, it is possible to eliminate the labor of separately pushing the engagement piece in the engagement releasing direction, which would be required in a case of fitting the tubular member to the columnar part if only the standing posture was maintained.

A third aspect is the cover for the fuel tank of the second aspect, wherein the tubular member is attached to the columnar portion by a mounting snap fit mechanism. The mounting snap fit mechanism comprises the columnar portion having a lock groove and a locking piece formed on the tubular member. The locking piece has a locking claw portion configured to be engaged with the lock groove due to elastic deformation.

In accordance with the third aspect, since the locking piece is engaged with the lock groove of the mounting snap fit mechanism, the tubular member fitted to the columnar portion can be held in the retaining state.

A fourth aspect is the cover for the fuel tank of the third aspect, wherein the locking piece is disposed at a position where the locking piece does not come into contact with the columnar portion while a posture of the tubular member fitted to the upper end part of the columnar portion is changed from the inclined posture to the standing posture.

In accordance with the fourth aspect, while the posture of the tubular member fitted to the upper end part of the columnar portion is changed from the inclined posture to the standing posture, the contact (interference) of the locking piece with respect to the columnar portion can be avoided. Thus, the tubular member can be smoothly changed from the inclined posture to the standing posture.

A fifth aspect is the cover for the fuel tank of any one of the first to fourth aspects, wherein the tubular member has a slit extending in an axial direction thereof. The columnar portion includes an alignment projection configured to slidably engage with the slit.

In accordance with the fifth aspect, when the tubular member is fitted to the columnar portion in a state in which the slit of the tubular member and the alignment projection of the columnar portion are made to correspond to each other, the tubular member can be fitted to the columnar portion in a normal mounting state by relatively moving the alignment projection in the slit. However, when the tubular member is attempted to be fitted to the columnar portion in a state in which the slit of the tubular member and the alignment projection of the columnar portion do not correspond to each other, the alignment projection interferes (abuts) with the tubular member. Accordingly, the fitting of the tubular member is prevented. Therefore, erroneous assembly of the tubular member with respect to the columnar part can be avoided.

A sixth aspect is the cover for the fuel tank of any one of the first to fifth aspects, wherein the columnar portion is formed by die release in a direction orthogonal to an axis of the columnar portion.

In accordance with the sixth aspect, in comparison with the case where the columnar portion is formed by die release in the axial direction, it is possible to correct the mold, such as by engraving, with respect to the collapse of the columnar portion caused by the resin molding.

A seventh aspect is the cover for the fuel tank of the sixth aspect, wherein the connecting member includes a spring guide extending in the upward/downward direction. The spring guide is fitted with a coil spring biasing the cover member in a separating direction. The spring guide is formed by die release in the same direction as the mold release direction of the columnar portion.

In accordance with the seventh aspect, the spring guide can be formed simultaneously with the columnar portion.

The invention claimed is:

1. A cover for a fuel tank, comprising:
a cover member closing an opening of the fuel tank; and
a connecting member configured to be connected to the cover member and configured to move in an upward/downward direction relative to the cover member,
wherein:
the cover member includes a tubular portion made of a resin and extending in the upward/downward direction;
the connecting member includes a columnar portion made of a resin and extending in the upward/downward direction;
the columnar portion is movably disposed in the tubular portion wherein the columnar portion is configured to move in the upward/downward direction relative to the tubular portion; and
a tubular member made of a metal substantially covers an outer circumferential surface of the columnar portion;
the columnar portion is connected to the tubular portion by a suspension snap fit mechanism configured to allow the columnar portion to be movable relative to the tubular portion and suspended from the tubular portion in the upward/downward direction;
the suspension snap fit mechanism comprises the tubular portion having an engagement hole and an engagement piece formed on the columnar portion, the engagement piece is positioned near an upper end of the columnar portion and includes an engagement claw portion configured to engage the engagement hole via elastic deformation;
an upper end part of the columnar portion includes an inclined surface configured to allow fitting of the tubular member to the columnar portion from above in an inclined posture such that the engagement claw portion is disposed in a lower end part of the tubular member;
the tubular member is attached to the columnar portion by a mounting snap fit mechanism; and
the mounting snap fit mechanism comprises the columnar portion having a lock groove and a locking piece formed on the tubular member, the locking piece having a locking claw portion configured to engage the lock groove via elastic deformation.

2. The cover for the fuel tank according to claim 1, wherein the locking piece is configured to avoid contact the columnar portion in response to transitioning a posture of the tubular member fitted to the upper end part of the columnar portion from the inclined posture to a standing posture.

3. The cover for the fuel tank according to claim 1, wherein:
the tubular member includes a slit extending in an axial direction thereof; and
the columnar portion includes an alignment projection configured to slidably engage the slit.

4. The cover for the fuel tank according to claim 1, wherein a lowermost edge of the tubular member is spaced apart from a lowermost edge of the columnar portion in the upward/downward direction.

5. The cover for the fuel tank according to claim 1, wherein the tubular member is positioned between the columnar portion and the tubular portion.

* * * * *